(12) United States Patent
Muramatsu et al.

(10) Patent No.: US 7,081,738 B2
(45) Date of Patent: Jul. 25, 2006

(54) GENERATING DEVICE HAVING MAGNETO GENERATOR

(75) Inventors: Shuichi Muramatsu, Numazu (JP); Hideaki Suzuki, Numazu (JP); Masanori Nakagawa, Numazu (JP); Masakatsu Takahashi, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 92 days.

(21) Appl. No.: 10/973,492

(22) Filed: Oct. 26, 2004

(65) Prior Publication Data

US 2005/0093520 A1  May 5, 2005

(30) Foreign Application Priority Data

Oct. 31, 2003  (JP) ............................ 2003-372682

(51) Int. Cl.
| | |
|---|---|
| H02H 9/00 | (2006.01) |
| H02P 11/00 | (2006.01) |
| H02M 5/45 | (2006.01) |
| H02M 1/12 | (2006.01) |
| H02M 3/24 | (2006.01) |

(52) U.S. Cl. ............................ 322/24; 322/28; 363/40; 363/98; 363/37; 363/56.02

(58) Field of Classification Search .................. 322/28, 322/46, 10, 24; 363/40, 98, 37, 56.01, 56.02
See application file for complete search history.

(56) References Cited

U.S. PATENT DOCUMENTS

| | | | | |
|---|---|---|---|---|
| 5,038,092 A | * | 8/1991 | Asano et al. | ................. 318/811 |
| 5,255,175 A | * | 10/1993 | Uchino | ......................... 363/81 |
| 5,793,167 A | * | 8/1998 | Liang et al. | ................. 318/141 |
| 6,049,194 A | * | 4/2000 | Nakagawa et al. | ............. 322/20 |
| 6,556,457 B1 | * | 4/2003 | Shimazaki et al. | ............ 363/34 |
| 2003/0222513 A1 | * | 12/2003 | Kuribayashi | .................. 310/19 |

FOREIGN PATENT DOCUMENTS

| | | | | |
|---|---|---|---|---|
| JP | 11-046456 | | 2/1999 | |
| JP | 2001-157497 | | 6/2001 | |
| JP | 2004104854 A | * | 4/2004 | |
| JP | 2004173482 A | * | 6/2004 | |
| JP | 2005133646 A | * | 5/2006 | |

* cited by examiner

Primary Examiner—Julio Cesar Gonzalez Ramirez
(74) Attorney, Agent, or Firm—Pearne & Gordon LLP

(57) ABSTRACT

A generating device that includes an AC/DC conversion unit having a rectifier circuit that rectifies an output of a magneto rotor and applies the output to a battery, and an inverter circuit that converts a voltage of the battery into an AC control voltage and applies the AC control voltage to an armature coil of the magneto generator, performs chopper control that controls switch elements of the inverter circuit so as to interrupt an output current of the magneto generator to control the output of the magneto generator when a rotational speed of the magneto generator is lower than a set speed, and performs drive control that applies the AC control voltage from the battery through the inverter circuit to the armature coil when the rotational speed becomes higher than the set speed, and changes a phase angle of the AC control voltage to control the output of the magneto generator.

18 Claims, 18 Drawing Sheets

GENERATING DEVICE HAVING MAGNETO GENERATOR

TECHNICAL FIELD OF THE INVENTION

The present invention relates to a generating device that converts an AC output of a magneto generator into a DC output and supplies the DC output to a load.

BACKGROUND OF THE INVENTION

A magneto generator is comprised of a magnet rotor, and a stator including an n-phase armature coil (n is an integer equal to or more than one) wound around an armature core having a magnetic pole portion facing a magnetic pole of the magnet rotor. Such a magneto generator is mounted to an internal combustion engine for driving a vehicle, and often used for charging a battery in the vehicle.

When the battery is charged with a rectified output of the magneto generator driven by the internal combustion engine, the battery does not start to be charged until a rotational speed of the engine increases to a certain extent and a no-load output voltage of the magneto generator exceeds a voltage across the battery. When a compact magneto generator is used, a rotational speed at which a battery starts to be charged is high, and thus the battery cannot be charged during a low speed rotation of the engine. For allowing the battery to be charged even during the low speed rotation of the engine, increasing the number of turns of the armature coil without changing a structure of the magneto generator can be considered, which, however, causes an insufficient output to be obtained from the magneto generator during a high speed rotation of the engine. For generating a sufficient output from the magneto generator during the low speed rotation of the engine, and also obtaining a sufficient output from the magneto generator during the high speed rotation of the engine, an armature coil with many turns needs to be wound by using a conductor with a large area, which increases a size and a weight of the magneto generator. A large magneto generator unpreferably increases a weight of the engine to cause poor fuel economy, or increases inertia of the engine to cause poor acceleration performance. Further, the large magneto generator cannot be mounted to a compact vehicle such as a motorcycle.

Thus, as described in Japanese Patent Laid-Open No. 2001-157497, a generating device has been proposed in which an output of a magneto generator is boosted by chopper control that interrupts a current supplied from a magneto generator through a rectifier circuit to a battery with a predetermined duty ratio in order to make up for an insufficient output in a low speed rotation range. Such chopper control can make up for the insufficient output in the low speed rotation range, and adjusting a duty ratio of on/off of an output current can adjust a charging current of the battery. For example, when a magneto generator is used whose rotational speed at which a battery starts to be charged without performing chopper control is 600 rpm, the rotational speed at which the battery starts to be charged can be reduced to, for example, 200 rpm by the chopper control.

As described in Japanese Patent Laid-Open No. 11-46456, a generating device has been proposed in which a circuit is provided that applies an AC control voltage to an armature coil of a magneto generator, and a phase angle of the AC control voltage is controlled to control an output of the magneto generator. The generating device described in Japanese Patent Laid-Open No. 11-46456 includes the magneto generator, a diode bridge full-wave rectifier circuit that converts an AC output of the magneto generator to a DC output, voltage storage means such as a battery or a capacitor connected across output terminals of the rectifier circuit, and an inverter circuit that converts the voltage across the voltage storage means into the AC control voltage and applies the AC control voltage to the armature coil of the generator. In the generating device, the voltage across the voltage storage means is converted into the AC control voltage having the same frequency as a voltage induced in the armature coil of the magneto generator, and the inverter circuit is controlled so as to apply the AC control voltage to the armature coil to change a phase of the AC control voltage, thus controlling the output of the magneto generator.

In the above described generating device, when the phase of the AC control voltage applied to the armature coil of the magneto generator is changed to an advancing side, an amount of magnetic flux acting on the armature coil can be reduced to restrain the output of the magneto generator. When the phase of the AC control voltage applied to the armature coil is changed to a lagging side, the amount of magnetic flux acting on the armature coil can be increased to increase the output of the magneto generator. Such control of the output of the magneto generator by applying the AC control voltage from the voltage storage means provided on a load side through the inverter circuit to the armature coil is herein referred to as "drive control" in the sense of controlling the output while driving the magneto generator from the load side.

Such drive control can change the phase angle of the AC control voltage to the lagging side to increase the output of the magneto generator during a low speed rotation. When the output of the magneto generator becomes excessive during a high speed rotation of the generator, the phase angle of the AC control voltage can be changed to the advancing side to restrain the output.

Such drive control can reduce a rotational speed at which a battery starts to be charged when the battery is charged with a rectified output of the magneto generator. For example, in a generating device using a magneto generator whose rotational speed at which a battery starts to be charged without drive control is 600 rpm, the rotational speed at which the battery starts to be charged can be reduced to 550 rpm by the drive control.

As described above, in the generating device using the magneto generator, the chopper control can increase the output of the magneto generator during the low speed rotation of the engine, and adjusting the duty ratio of the chopper control can adjust the output of the generator. However, the chopper control can increase the output of the generator only in the low speed rotation range of the engine, and the generation output cannot be increased in middle and high speed rotation range by the chopper control.

When the magneto generator is driven by an internal combustion engine for a vehicle, a problem occurs that the output of the generator becomes excessive during the high speed rotation of the engine. A short circuit type regulator has been used that short-circuits an armature coil when an output voltage of the generator exceeds a set value in order to prevent an output of a magneto generator from becoming excessive during a high speed rotation of an engine. However, when the short circuit type regulator is used, a high short circuit current passes through the armature coil in voltage control, and thus the armature coil unpreferably generates much heat.

The drive control of the magneto generator can prevent the output of the magneto generator from becoming excessive during the high speed rotation of the engine without using the short circuit type regulator, but an advantage of increasing the output of the magneto generator during the low speed rotation cannot be reasonably expected from the drive control.

SUMMARY OF THE INVENTION

Thus, an object of the invention is to provide a generating device that can generate an increased output from a magneto generator during a low speed rotation, and also generate a sufficient output from the magneto generator in middle and high rotation ranges, without increasing a size of the generator, to control to keep a generation output at a target value from a low speed rotation range to the high speed rotation range without any trouble.

The invention is applied to a generating device including: a magneto generator having a magnet rotor and a stator with an n-phase armature coil (n is an integer equal to or more than one); voltage storage means; an n-phase diode bridge full-wave rectifier circuit that converts an AC output of the magneto generator into a DC output to apply the DC output to the voltage storage means; an n-phase bride type inverter circuit in which each branch of a bridge is constituted by switch elements, the voltage storage means is connected between DC terminals, and an AC terminal is connected to an output terminal of the magneto generator; and a controller that controls the switch elements of the inverter circuit so as to keep the output of the magneto generator at a target value, a load being connected across the voltage storage means.

In the invention, the controller includes: chopper control means that controls on/off of a part of the switch elements that constitute the inverter circuit so as to interrupt a current passing from the magneto generator through the rectifier circuit with a predetermined duty ratio to control to keep the output of the magneto generator at the target value; drive control means that controls the switch elements that constitute the inverter circuit so as to apply an AC control voltage having the same frequency as a no-load induced voltage of the armature coil from the voltage storage means through the inverter circuit to the armature coil to control to keep the output of the magneto generator at the target value; and control mode switching means that switches a control mode from a chopper control mode to a drive control mode and from the drive control mode to the chopper control mode according to a control mode switching condition that is at least a rotational speed of the magneto generator, so that control by the chopper control mode is performed when the rotational speed of the magneto generator is lower than a set rotational speed, and control by the drive control mode is performed when the rotational speed of the magneto generator is higher than the set rotational speed, the chopper control mode being a control mode where control to keep the output of the magneto generator at the target value is performed by the chopper control means, and the drive control mode being a control mode where control to keep the output of the magneto generator at the target value is performed by the drive control means.

As described above, there are provided the chopper control means that controls the output of the magneto generator by chopper control; the drive control means that controls the output of the magneto generator by drive control; and the control mode switching means that switches the control mode according to the control mode switching condition that is at least the rotational speed of the magneto generator, so that the control by the chopper control mode is performed when the rotational speed is lower than the set speed, and the control by the drive control mode is performed when the rotational speed is higher than the set speed, and thus the control by the chopper control mode is performed during a low speed rotation of the magneto generator to increase the output of the generator and reduce a rotational speed at which a load starts to be driven.

During a high speed rotation where the output of the generator cannot be increased by the chopper control, the output of the generator can be controlled by the drive control, and thus the output of the generator can be controlled without using a short circuit type regulator from a low speed rotation range to a high speed rotation range without any trouble.

In an aspect of the invention, the drive control means is comprised so as to change a phase angle of the AC control voltage to an advancing side and a lagging side to control to keep the output of the magneto generator at the target value.

BRIEF DESCRIPTION OF THE DRAWINGS

The above and other objects and features of the present invention will be apparent from the detailed description of the preferred embodiments of the invention, which is described and illustrated with reference to the accompanying drawings, in which.

DETAILED DESCRIPTION OF THE PREFERRED EMBODIMENTS

Now, embodiments of the invention will be described with reference to the drawings.

First Embodiment

Figure 1:
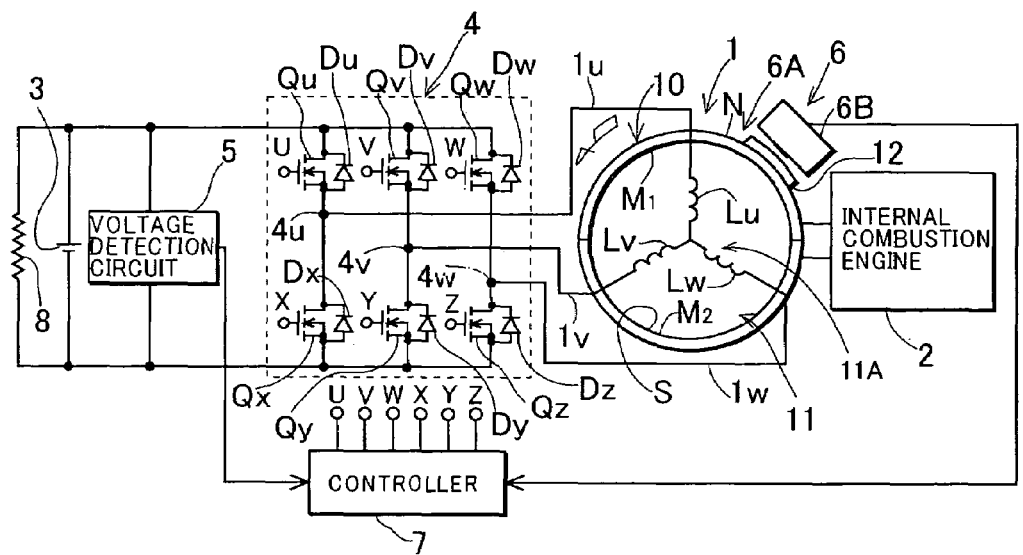
FIG. 1 is a circuit diagram of a construction example of hardware of a generating device according to the invention.

FIG. 1 shows an entire construction of an embodiment in which the invention is applied to a generating device that uses a magneto generator having a stator with a three-phase armature coil to charge a battery. In FIG. 1, a reference numeral 1 denotes a magneto generator driven by an internal combustion engine 2, and 3 denotes a battery. A reference numeral 4 denotes an AC/DC conversion unit provided between the magneto generator 1 and the battery 3, which has a rectifier and an inverter circuit. A reference numeral 5 denotes a voltage detection circuit that detects a voltage output from the magneto generator 1 through the rectifier circuit in the conversion unit 4 (a voltage across the battery), and 6 denotes a signal generating device that generates pulses when a rotational angle position of a magnet rotor of the magneto generator 1 matches a predetermined position. A reference numeral 7 denotes a controller having a microprocessor, and 8 denotes a load connected across the battery 3. The controller 7 uses an output of the voltage detection circuit 5 and an output of the signal generating device 6 as inputs to control the inverter circuit in the AC/DC conversion unit 4 so as to keep an output of the magneto generator 1 at a target value.

More specifically, the magneto generator 1 is comprised of a magnet rotor 10 and a stator 11 placed inside the magnet rotor 10. The magnet rotor 10 is comprised of a rotor yoke made of a ferromagnetic material such as iron and formed into a substantial cup shape, and a permanent magnet mounted to an inner periphery of a peripheral wall of the rotor yoke. The magnet rotor 10 is mounted to the internal combustion engine (not shown in FIG. 1), with a boss mounted to a center of a bottom wall of the rotor yoke being fitted to a crankshaft of the engine.

Generally, in the magneto generator, the permanent magnet mounted to the rotor yoke produces a magnetic field with 2m poles (m is an integer equal to or more than one). In this embodiment, m is one, and two arcuate permanent magnets M1 and M2 placed at a 180° interval are mounted to the inner periphery of the peripheral wall of the rotor yoke. The permanent magnets M1 and M2 are radially polarized in different polarizing directions to produce the magnetic field with two poles. In this embodiment, the magnet rotor 10 is rotated counterclockwise in FIG. 1 during a forward rotation of the internal combustion engine.

The stator 11 is comprised of an armature core (not shown) with a magnetic pole portion facing a magnetic pole of the magnet rotor 10, and a three-phase armature coil 11A comprising three phase coils Lu to Lw wound around the armature core. The three phase coils Lu to Lw are star connected, and terminals opposite to a neutral point of the coils are external terminals $1u$ and $1w$.

The stator 11 is secured to a stator mounting portion formed on a part of a casing of the internal combustion engine, and the magnetic pole portion formed on a tip of each of salient poles of the armature core of the stator faces the magnetic pole of the magnet rotor 10 with a predetermined gap therebetween.

A reluctor 12 constituted by an arcuate protrusion extending circumferentially of the peripheral wall is formed on an outer periphery of the peripheral wall of the rotor yoke of the magnet rotor 10, and a signal generating rotor 6A is comprised of the reluctor 12 and the rotor yoke of the magnet rotor 10. A pulse signal generator 6B that generates pulses with different polarities when a leading edge and a trailing edge in a rotational direction of the reluctor 12 are detected is placed near the rotor 6A, and the signal generating device 6 is comprised of the signal generating rotor 6A and the pulse signal generator 6B. The pulse signal generator 6B is secured to the casing or the like of the engine.

The pulse signal generator 6B detects the leading edge in the rotational direction of the reluctor 12 to generate a first pulse higher than a threshold when a rotational angle position of the magnet rotor (a rotational angle position of the crankshaft of the engine) matches a preset first position, and the pulse signal generator 6B detects the trailing edge in the rotational direction of the reluctor 12 to generate a second pulse higher than a threshold having a polarity different from the first pulse when the rotational angle position of the magnet rotor matches a second position used as an ignition position during a low speed rotation of the engine. The pulse signal generator includes a core having on a tip thereof a magnetic pole portion facing the reluctor, a signal coil wound around the core, and a permanent magnet magnetically connected to the core, and changes of a magnetic flux that occur in the core when the reluctor starts and finishes facing the tip of the core, respectively, induce pulses with different polarities in the signal coil.

Generally, the position where the pulse signal generator 6B generates the first pulse is set to a position advancing from a maximum advancing position of an ignition position of the engine (a rotational angle position of the crankshaft when the engine is ignited), and the position where the pulse signal generator 6B generates the second pulse is set to a position appropriate for an ignition position at a start of the engine (a position close to a crank angle position when a piston reaches top dead center). The pulses generated by the pulse signal generator 6B are used for obtaining rotational speed information or rotational angle information of the engine when ignition timing or fuel injection time of the engine is controlled, and also used for detecting a reference phase of a below described AC control voltage when the AC control voltage is generated in drive control. In the embodiment, the internal combustion engine that drives the magneto generator 1 is a single-cylinder engine.

The AC/DC conversion unit 4 is comprised of a diode bridge full-wave rectifier circuit constituted by bridge connected diodes Du, Dv, Dw, Dx, Dy and Dz, and a bridge type inverter circuit in which three upper branches of a bride are constituted by switch elements Qu to Qw each having one end connected in common, and three lower branches of the bridge are constituted by switch elements Qx to Qz each having one end connected in common and the other end connected to the other end of each of the switch elements Qu to Qw. In the shown embodiment, MOSFETs are used as the switch elements Qu, Qv, Qw, Qx, Qy and Qz that constitute the inverter circuit.

A positive DC terminal 4a and a negative DC terminal 4b, and a three-phase AC terminals 4u, 4v and 4w are drawn in common from the inverter circuit constituted by the switch elements Qu, Qv, Qw, Qx, Qy and Qz and from the rectifier circuit constituted by the diodes Du, Dv, Dw, Dx, Dy and Dz, and the three-phase AC terminals 4u, 4v and 4w are connected to three-phase external terminals 1u, 1v and 1w of the magneto generator 1. The positive DC terminal 4a and the negative DC terminal 4b are connected to a positive terminal and a negative terminal, respectively, of the battery 3.

The full-wave rectifier circuit constituted by the diodes Du, Dv, Dw, Dx, Dy and Dz rectifies a three-phase AC voltage induced in the armature coil 11A of the magneto generator 1 and supplies a charging current to the battery that constitutes voltage storage means 3.

The inverter circuit including the bridge circuit constituted by the switch elements Qu, Qv, Qw, Qx, Qy and Qz converts the voltage across the battery 3 into an AC voltage and applies the AC voltage as the AC control voltage to the armature coil 11A, when the drive control is performed to keep the output of the magneto generator 1 at the target value.

The pulse signals generated by the signal generating device 6B of the signal generating device 6 are converted into signals that can be recognized by the microprocessor with an unshown waveform shaping circuit, and input to the microprocessor in the controller 7.

In the embodiment, the voltage applied across the battery 3 from the magneto generator through the AC/DC conversion unit 4 is the output of the magneto generator 1 to be controlled. In order to keep the voltage applied to the battery 3 (the output of the magneto generator 1) at the target value, the voltage detection circuit 5 that detects the voltage across the battery 3 is provided, the output of the voltage detection circuit is converted into a digital signal by an unshown A/D converter and input to the microprocessor in the controller 7. The voltage detection circuit 5 is, for example, constituted by a resistance dividing circuit that divides the voltage across the battery 3 and coverts the voltage into a voltage signal proportional to the voltage.

In the invention, chopper control and drive control are performed in order to control to keep the output of the magneto generator 1 at the target value. Now, the chopper control and the drive control will be described.

The chopper control is control that interrupts an output current of the magneto generator 1 to boost a voltage induced in the armature coil of the magneto generator. In the chopper control, for example, the switch elements Qx, Qy and Qz that constitute the lower branch of the bridge of the inverter circuit are simultaneously turned on/off, or the switch elements Qu, Qv and Qw that constitute the upper branch of the bridge are simultaneously turned on/off to interrupt the output current of the magneto generator and boost the output of the magneto generator.

Figure 16:
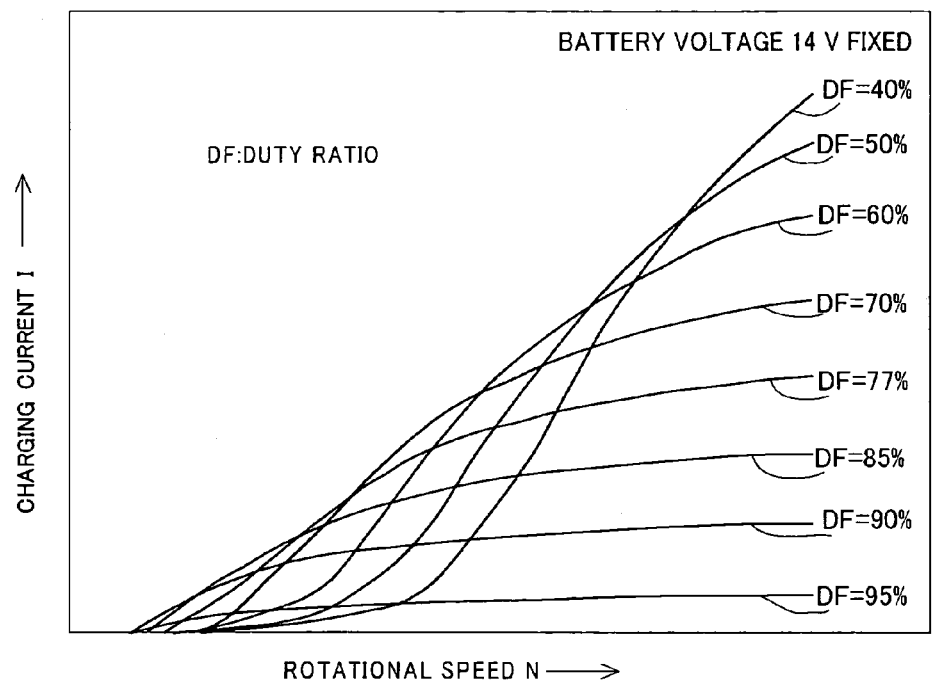
FIG. 16 is a graph of a charging current to rotational speed characteristic in chopper control when a battery is charged with a rectified output of a magneto generator in the generating device according to the invention.

FIG. 16 shows an example of a charging current to rotational speed characteristic when the chopper control is performed by simultaneously turning on/off the switch elements Qx, Qy and Qz on the lower side of the bride of the inverter circuit with a predetermined duty ratio at a regular cycle T in the generating device in which the battery is charged with the rectified output of the magneto generator. In FIG. 16, DF denotes the duty ratio of the switch element in the chopper control, and the duty ratio DF is expressed by a formula: DF=(Ton/T)×100%, where T is the cycle at which the switch element is turned on in the chopper control, and Ton is an on period of the switch element. In this embodiment, the voltage across the battery 3 is 14 V (fixed).

As shown in FIG. 16, the charging current of the battery at each rotational speed can be changed by changing the duty ratio DF, and thus the control to keep the voltage across the battery at the target value can be performed by controlling the duty ratio DF so as to eliminate deviation between the voltage (output) detected by the voltage detection circuit 5 and the target value to control the charging current. Also, the control to keep the charging current of the battery at the target value can be performed by controlling the duty ratio DF so that deviation between the charging current of the battery (the output current of the generator) and the target value becomes zero. Further, the sum of the charging current of the battery and a load current passing through the load 8 may be used as an output current of the generator to control to keep the output current at the target value.

The output control of the generator by the chopper control is performed, for example, as described below. The voltage across the battery 3 is herein controlled to be kept at 14 V (fixed). In an operation at a rotational speed of N0 and with a duty ratio DF of 80%, a charging current of the battery of I0, and the battery voltage of 14 V as a point A in FIG. 17, when the battery voltage decreases, the duty ratio DF is reduced to, for example, 60% to increase the charging current to I1 and move an operation point to a point B, thereby keeping the battery voltage at 14 V. When the battery voltage increases above 14 V during the operation at the point A, the duty ratio DF is increased to 90% to reduce the charging current to I2 and move the operation point to a point C.

Figure 17:
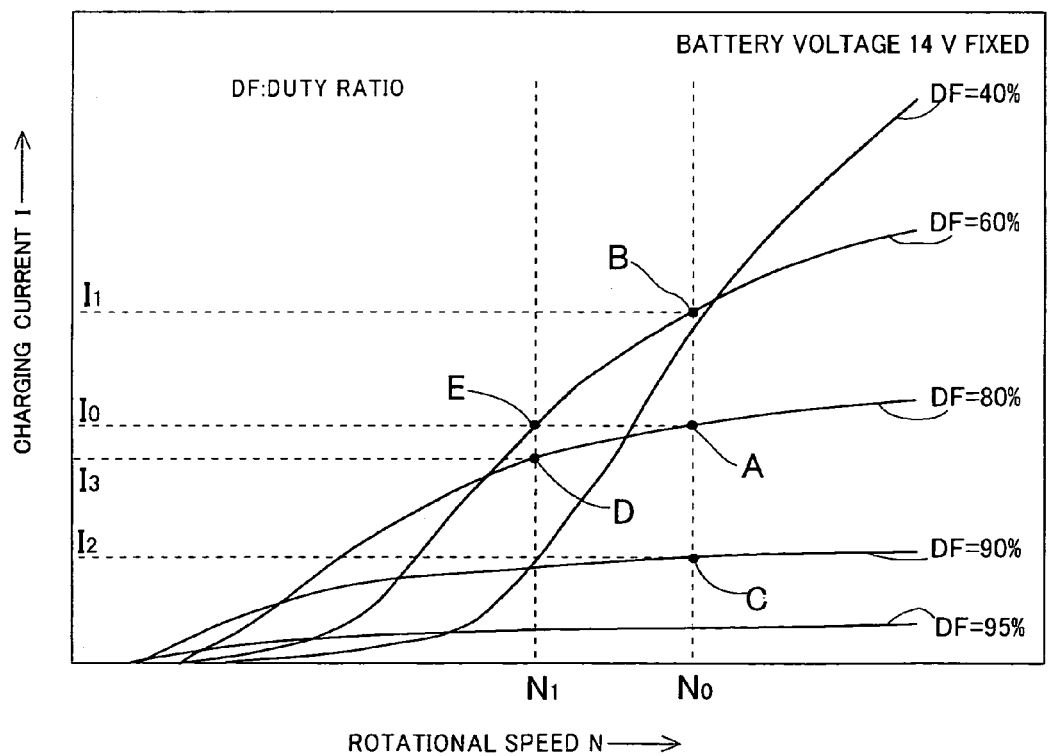
FIG. 17 is a graph illustrating a control operation in the chopper control.

In FIG. 17, when the rotational speed decreases from N0 to N1 during the operation at the point A, the operation point moves from the point A to a point D. In this state, the charging current decreases from I0 to I3 and is insufficient, and thus the duty ratio DF is reduced to 60% to increase the charging current to I0 and move the operation point to a point E.

In the chopper control, a relationship between a changing direction of the duty ratio and a changing direction of the output current of the magneto generator is not uniform, and in a relatively high rotational speed range, reducing the duty ratio increases the output of the generator, but in a low rotational speed range, reducing the duty ratio reduces or increases the output of the magneto generator. Because the nonuniform relationship between the changing direction of the duty ratio and the changing direction of the output of the magneto generator makes the control difficult, it is preferable in the chopper control that a duty ratio at which a maximum output current can be obtained from the magneto generator at each rotational speed of the magneto generator in the chopper control is previously determined by a test as "a maximum duty ratio", and a maximum duty ratio arithmetical operation map that provides a relationship between the maximum duty ratio and the rotational speed is stored in a ROM of the microprocessor. When the battery voltage is 14 V (fixed), the relationship between the maximum duty ratio and the rotational speed is as indicated by a curve a in FIG. 20. Such a map is stored to control the duty ratio at each rotational speed so that the duty ratio does not exceed the maximum duty ratio arithmetically operated from the map, thereby preventing a range where the output current of the magneto generator decreases when the duty ratio is reduced from being used for the control.

Figure 20:
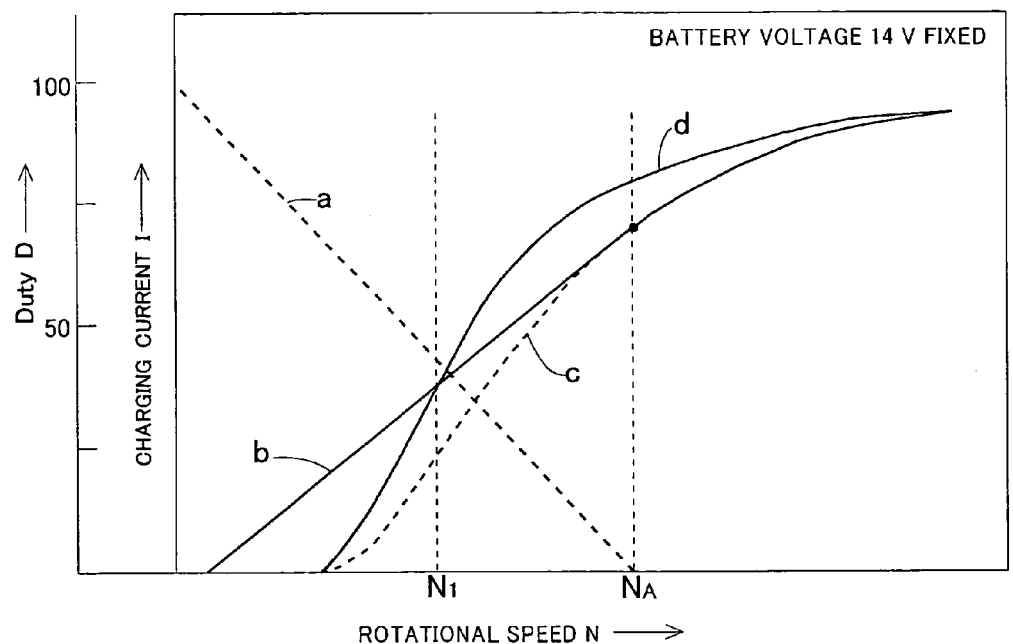
FIG. 20 is a graph of a characteristic of a map stored in a ROM of a microcomputer in the embodiment of the invention.

A curve b in FIG. 20 is a maximum charging current characteristic curve by the chopper control that provides a relationship between the charging current I of the battery and the rotational speed obtained when the duty ratio DF is set equal to the maximum duty ratio at each rotational speed. A curve c in FIG. 20 is a charging current characteristic curve in no control that provides a relationship between the charging current of the battery and the rotational speed when the output of the magneto generator is supplied to the battery through the rectifier circuit without performing the chopper control. In a range of a rotational speed NA and higher where the maximum duty ratio becomes zero, the maximum charging current characteristic curve b by the chopper control matches the charging current characteristic curve c in no control.

Performing the above described chopper control can increase the output voltage during the low speed rotation of the magneto generator to reduce the rotational speed at which the battery starts to be charged, and allows the battery to be charged even during the low speed rotation of the engine, without increasing the size of the magneto generator.

Figure 26:
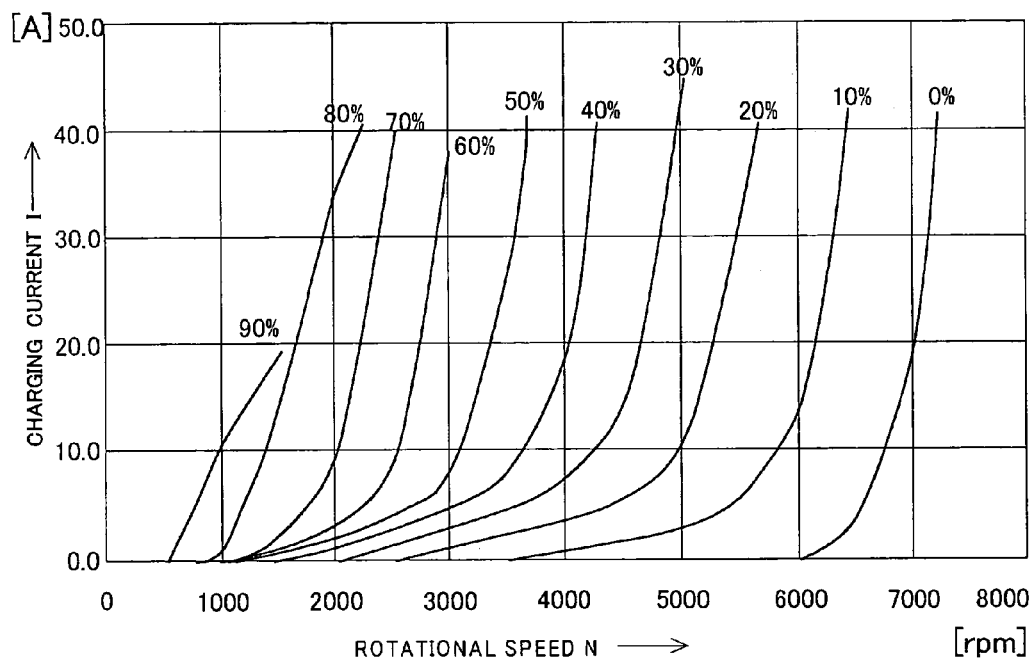
FIG. 26 is a graph of another charging current to rotational speed characteristic in the drive control when the battery is charged with the rectified output of the magneto generator in the generating device according to the invention.

A generator output to rotational speed characteristic in the chopper control differs depending on specifications of the magneto generator. The generator output to rotational speed characteristic in the chopper control is sometimes as shown in FIG. 26 depending on the specifications of the magneto generator. In the example in FIG. 26, the voltage across the battery is 14 V, and the duty ratio is changed from 0% to 90%.

On the other hand, the drive control is control that controls the switch elements Qu, Qv, Qw, Qx, Qy and Qz that constitute the inverter circuit so as to apply an AC control voltage having the same frequency as a no-load induced voltage of the armature coil 11A from the voltage storage means (the battery 3 in this embodiment) provided on an output side of the rectifier circuit through the inverter circuit to the armature coil 11A to keep the output of the magneto generator at the target value.

Figure 18:
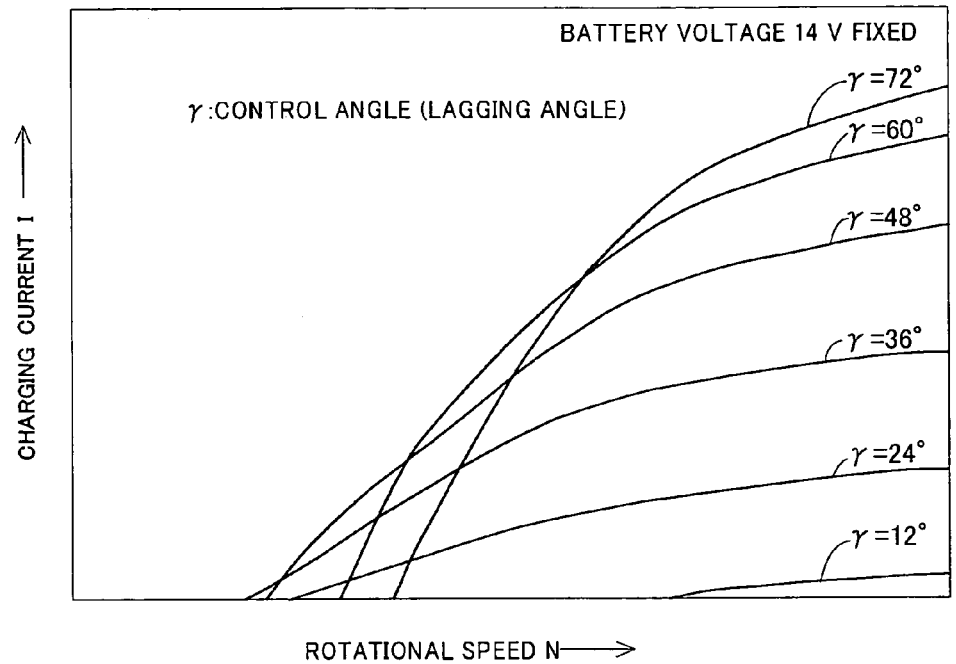
FIG. 18 is a graph of a charging current to rotational speed characteristic in drive control when the battery is charged with the rectified output of the magneto generator in the generating device according to the invention.

FIG. 18 shows an example of a characteristic that provides a relationship between the charging current I and the rotational speed N when a phase angle of the AC control voltage is changed with the voltage across the battery 3 being 14 V (fixed). The AC control voltage is an AC voltage having the same frequency as the induced voltage of the armature coil 11A, and the phase angle of the AC control voltage is changed to an advancing side or a lagging side with respect to a reference phase, which is a phase of the no-load induced voltage of the armature coil 11A. A phase difference between the no-load induced voltage of the armature coil and the AC control voltage is referred to as a phase angle $\gamma$ of the AC control voltage. Herein, a phase angle when the phase of the AC control voltage is set to the lagging side with respect to the reference phase is indicated by a positive value, and a phase angle when the phase of the AC control voltage is set to the advancing side with respect to the reference phase is indicated by a negative value. In the example in FIG. 18, the phase angle $\gamma$ is set to the lagging side with respect to the phase of the no-load induced voltage of the armature coil.

In the relatively high rotational speed range, changing the phase angle of the AC control voltage to the lagging side can increase the output of the magneto generator, and changing the phase angle of the AC control voltage to the advancing side can reduce the output of the magneto generator.

A waveform of the AC control voltage may be the same as or different from a waveform of the no-load induced voltage of the armature coil 11A. For example, a positive half wave and a negative half wave of the AC control voltage may have a rectangular waveform. When the AC control voltage having a different waveform from the no-load induced voltage of the armature coil 11A is applied to the armature coil 11A, the waveform of the output voltage of the magneto generator is deformed, which causes no problem because the output of the magneto generator is rectified and applied to the load in the generating device according to the invention.

The control to keep the output of the generator at the target value by the drive control is performed, for example, as described below. The voltage across the battery 3 is herein controlled to be kept at 14 V (fixed). It is assumed that in an operation at the rotational speed of N0 and with the phase angle $\gamma$ of 36°, and the charging current of the battery of I0, as a point A in FIG. 19, the battery voltage decreases below 14 V. At this time, the phase angle $\gamma$ is, for example, increased to 48° to increase the charging current to I1 and move an operation point to a point B, thereby keeping the battery voltage at 14 V. When the battery voltage increases above 14 V during the operation at the point A, the phase angle $\gamma$ is changed to the advancing side to 24° to reduce the charging current to I2 and move the operation point to a point C.

Figure 19:
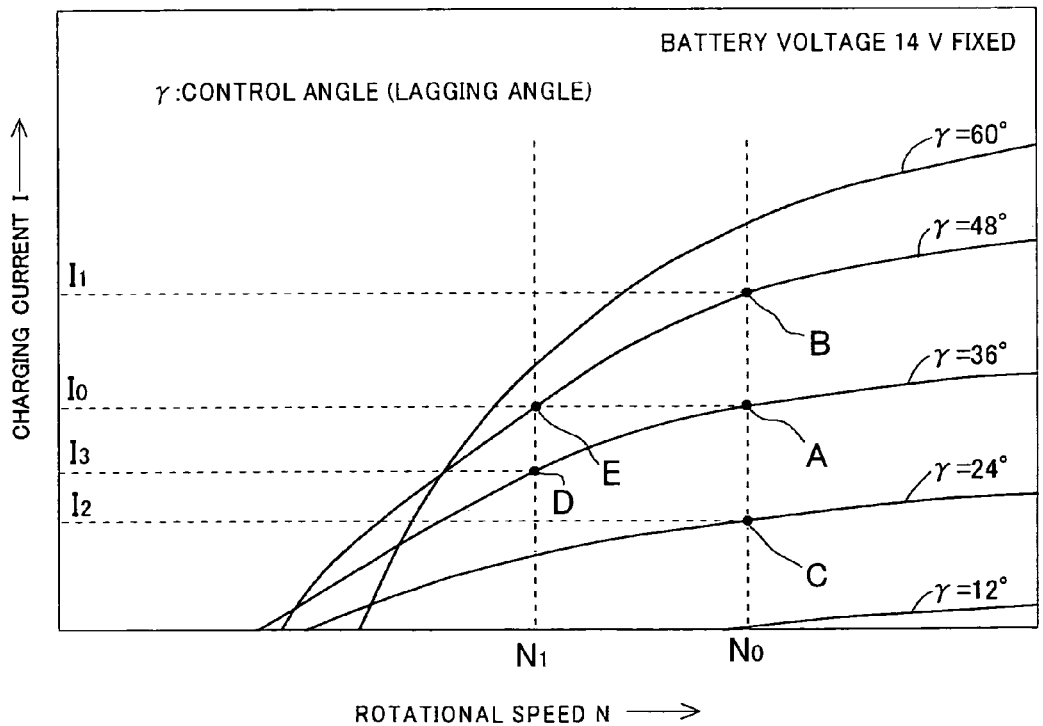
FIG. 19 is a graph illustrating a control operation in the drive control.

In FIG. 19, when the rotational speed decreases from N0 to N1 during the operation at the point A, the operation point moves from the point A to a point D. In this state, the charging current decreases from I0 to I3 and is insufficient, and thus the phase angle $\gamma$ is changed to the lagging side to 48° to increase the charging current to I0 and move the operation point to a point E.

In the drive control, there is a range where the output of the generator decreases when the phase angle $\gamma$ of the AC control voltage is lagged. Because a nonuniform relationship between a changing direction of the phase angle $\gamma$ and a changing direction of the output of the magneto generator makes the control difficult, it is preferable in the drive control that a phase angle at which a maximum output current can be obtained from the magneto generator at each rotational speed of the magneto generator in the drive control is previously determined by a test as "a maximum phase angle", and a maximum phase angle arithmetical operation map that provides a relationship between the maximum phase angle and the rotational speed is stored in the ROM of the microprocessor. Such a map is stored to control to set the phase angle of the AC control voltage to the advancing side with respect to the output maximum phase angle arithmetically operated from the map at each rotational speed, thereby preventing a range where the output of the magneto generator decreases when the phase angle of the AC control voltage is changed to the lagging side from being used for the control.

A maximum charging current characteristic curve of the drive control is shown by a curve d in FIG. 20, which provides a relationship between the maximum charging current of the battery and the rotational speed obtained when the phase angle of the AC control voltage is set to the maximum phase angle (the phase angle at which the maximum charging current can be passed) at each rotational speed when the voltage storage means is the battery.

Figure 21:
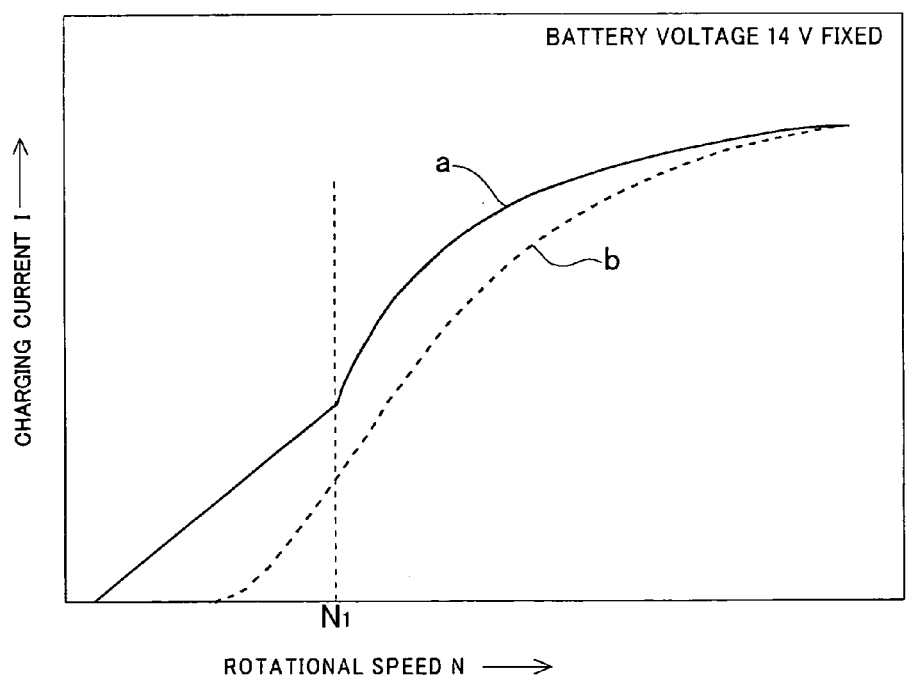
FIG. 21 is a graph of a maximum charging current to rotational speed characteristic obtained when a control mode is switched.

As is apparent from FIG. 20, in a rotational speed range where the rotational speed N is lower than a rotational speed N1, a larger output can be obtained from the magneto generator by the chopper control, while in a rotational speed range where the rotational speed N is higher than the rotational speed N1, a larger output can be obtained from the magneto generator by the drive control. In the embodiment, with the rotational speed N1 being a set speed, the output of the generator is controlled by the chopper control in the range where the rotational speed is the set speed N1 or lower, and the output of the generator is controlled by the drive control in the range where the rotational speed is higher than the set speed N1. A maximum charging current to rotational speed characteristic obtained when the control mode is thus switched is as shown by a curve a in FIG. 21. A curve b in FIG. 21 shows a charging current characteristic curve (of the rectifier circuit) in no control similar to the curve c in FIG. 20.

Such control allows a larger output to be obtained from the magneto generator from the low speed rotation range to the high speed rotation range of the magneto generator, as compared with the case of supplying the charging current from the magneto generator through the rectifier circuit to the battery (the curve c), reduces the rotational speed at which the battery starts to be charged, and also ensures a sufficient charging current in middle and high speed rotation ranges.

The microprocessor in the controller 7 executes a predetermined program stored in a nonvolatile memory such as a ROM or an EEPROM to construct means for controlling an ignition device or a fuel injection device that are unshown of the internal combustion engine, by using rotational angle position information and rotational speed information included in the pulses generated by the signal generating device 6B, and means for controlling the inverter circuit of the AC/DC conversion unit 4 so as to keep the output of the magneto generator obtained from the voltage detection circuit 5 (in this embodiment, the output voltage is the voltage across the battery) at the target value.

Figure 5:
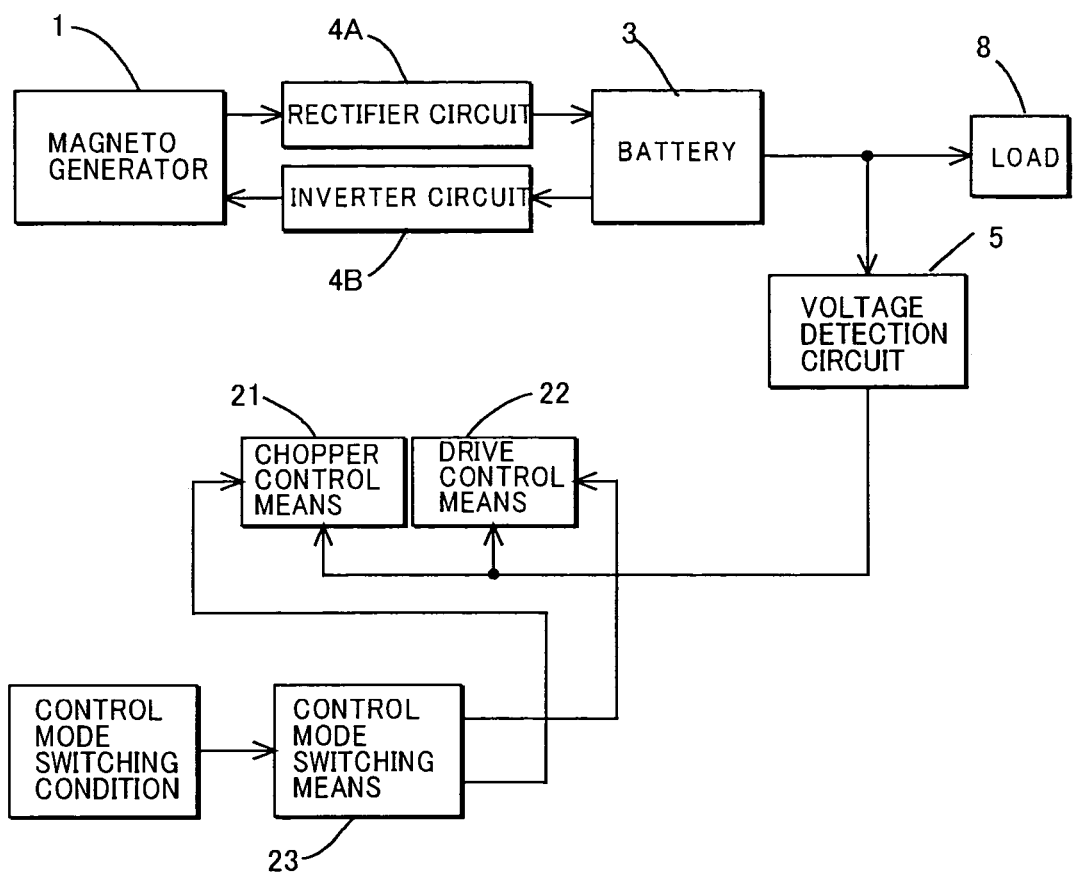
FIG. 5 is a block diagram of a construction of a control unit according to a first embodiment of the invention.

FIG. 5 shows a construction of the generating device according to the embodiment including various means constructed by the microcomputer in the controller 7. In FIG. 5, 1 denotes the magneto generator, 3 denotes the battery (the voltage storage means), 4A and 4B denote the rectifier circuit and the inverter circuit that constitute the AC/DC conversion unit 4 respectively, and 5 denotes the voltage detection circuit that detects the voltage across the battery 3 as the output of the magneto rotor.

In the invention, the controller 7 includes chopper control means 21, drive control means 22, and control mode switching means 23 that switches between a state of controlling the output of the magneto generator 1 by the chopper control means 21 and the state of controlling the output of the magneto generator 1 by the drive control means 22 according to a predetermined control condition.

The chopper control means 21 is means for controlling on/off of a part of the switch element that constitutes the inverter circuit 4B so as to interrupt the current passing from the magneto generator 1 through the rectifier circuit 4A with the predetermined duty ratio to control to keep the output of the magneto generator at the target value. The chopper control means 21 according to the embodiment arithmetically operates deviation between the voltage across the battery 3 detected by the voltage detection circuit 5 and the target value, arithmetically operates a duty ratio of the chopper control required for the deviation to be zero, and controls the switch elements Qx to Qz that constitute the lower branches of the bridge of the inverter circuit so as to be simultaneously turned on/off with the arithmetically operated duty ratio, thereby matching the voltage across the battery 3 with the target value.

The drive control means 22 is means for controlling the switch elements that constitute the inverter circuit 4B so as to apply the AC control voltage having the same frequency as the no-load induced voltage of the armature coil 11A of the magneto generator 1 from the battery 3 through the inverter circuit 4B to the armature coil 11A to control to keep the output of the magneto generator at the target value. The drive control means 22 according to the embodiment arithmetically operates the deviation between the voltage across the battery 3 detected by the voltage detection circuit 5 and the target value, arithmetically operates the phase angle of the AC control voltage required for the deviation to be zero, and controls on/off of the switch elements of the inverter circuit 4B so as to apply the AC control voltage having the arithmetically operated phase angle through the inverter circuit 4B to the armature coil 11A of the magneto generator, thereby matching the voltage across the battery 3 with the target value.

The control mode switching means 23 is means for switching the control mode between the chopper control mode and the drive control mode according to the predetermined control mode switching condition, the chopper control mode being the control mode where the control to keep the output of the magneto generator 1 at the target value is performed by the chopper control means 21, and the drive control mode being the control mode where the control to keep the output of the magneto generator 1 at the target value is performed by the drive control means. The control mode switching means 23 switches the control mode from the chopper control mode to the drive control mode and from the drive control mode to the chopper control mode according to the control mode switching condition that is at least the rotational speed of the magneto generator 1, so that the control by the chopper control mode is performed when the rotational speed of the magneto generator is lower than the set speed, and the control by the drive control mode is performed when the rotational speed of the magneto generator is higher than the set speed.

The control mode switching means 23 according to the embodiment sets the control mode to the chopper control mode after the magneto generator is started and until the rotational speed reaches the set speed N1 in FIGS. 20 and 21, and switches the control mode to the drive control mode when the rotational speed reaches the set speed N1. When the rotational speed becomes lower than the set speed N1 in the control by the drive control mode, the control mode is switched to the chopper mode.

Now, an operation of switching the control mode and a problem in the switching will be described with reference to FIG. 22.

Figure 15:
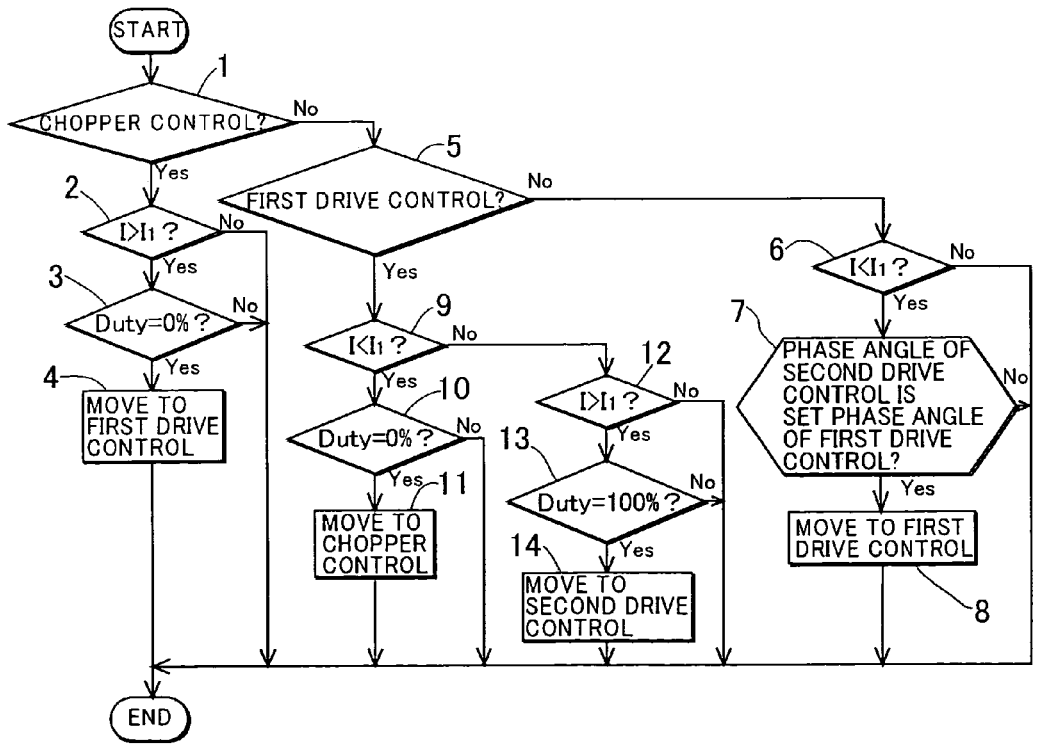
FIG. 15 is a flowchart of an algorithm of a program executed by a microprocessor for constructing control mode switching means in the sixth embodiment of the invention.
Figure 22:
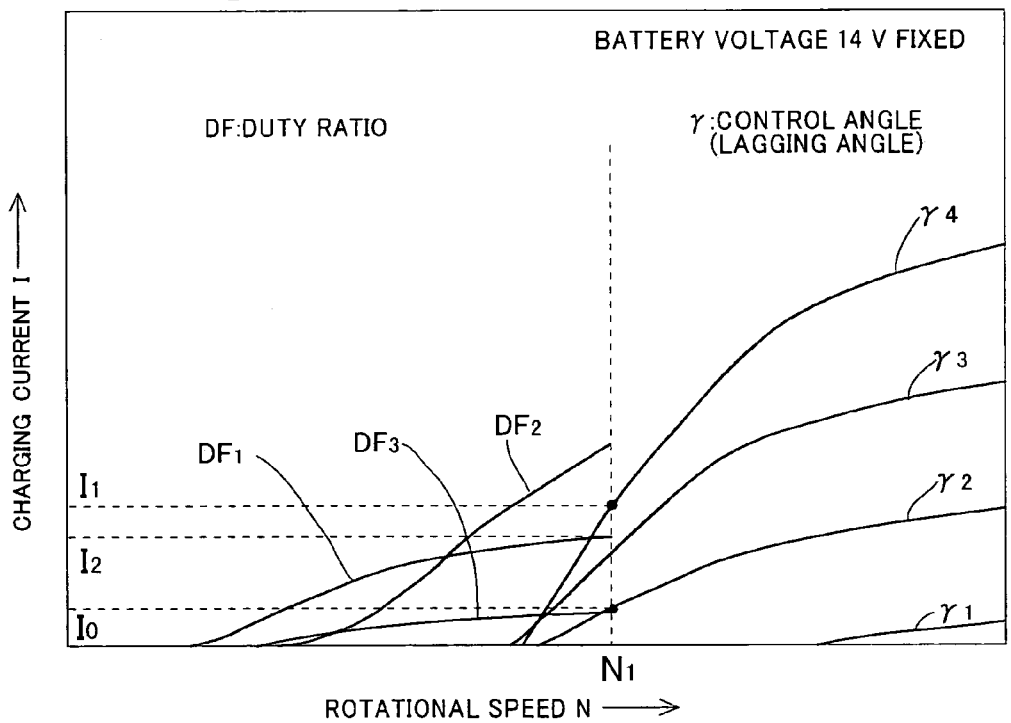
FIG. 22 is a graph illustrating a switching operation of the control mode in the embodiment of the invention.

FIG. 22 shows an example of a control characteristic when the magneto generator having the charging current to rotational speed characteristic in the chopper control and the charging current to rotational speed characteristic in the drive control as shown in FIGS. 15 and 18, respectively is used to perform the chopper control in the range where the rotational speed is lower than the set speed N1, and perform the drive control in the range where the rotational speed is the set speed N1 or higher to control to keep the battery voltage at 14 V. In FIG. 22, DF1 to DF3 (DF1<DF2<DF3) denote the duty ratios of the chopper control, and γ1 to γ4 (γ1<γ2<γ3<γ4) denote the phase angles of the drive control set to the lagging side with respect to the reference phase.

In FIG. 22, it is assumed that in the control by the drive control mode with the phase angle of the AC control voltage being γ2, the rotational speed decreases to the set speed N1 and the charging current becomes I0. At this time, if the control is switched to the chopper control with the duty ratio being DF1, the charging current gradually increases from I0 to I2 to increase the voltage across the battery. The charging current increases to I2 to abruptly increase load torque of the magneto generator.

In the case where the control mode is switched to the chopper control mode with the duty ratio being DF1 when the rotational speed decreases to N1 and the charging current becomes I1 in the drive control with the phase angle of the AC control voltage being γ4, the charging current gradually decreases from I1 to I2 to reduce the battery voltage and abruptly reduce the load torque. When the control is switched from the chopper control to the drive control, the charging current gradually changes the charging current to abruptly change the load torque.

Such switching of the control mode when the rotational speed reaches the set speed changes the charging current, and thus changes the battery voltage and the load torque of the generator, which may cause unstable control to prevent stable supply of power to the load 8. Thus, when the control mode is switched, it is preferable to set the duty ratio of the chopper control and the phase angle of the drive control so as not to change the charging current (the output of the generator).

In the embodiment, as shown in FIG. 20, the rotational speed N1 at which the maximum charging current obtained by the chopper control and the maximum charging current obtained by the drive control are reversed is used as the set speed to switch the control mode at the set speed. With the rotational speed being fixed at the set speed, the duty ratio of the chopper control is changed to determine a charging current I to duty ratio DF characteristic at the set speed N1. With the rotational speed being fixed at the set speed N1, the phase angle γ of the drive control is changed to determine a charging current to phase angle characteristic at the set speed N1. The charging current I to duty ratio DF characteristic at the set speed N1 is as shown by a curve a in FIG. 23. The charging current I to phase angle γ characteristic at the set speed N1 is as shown by a curve b in FIG. 23.

Figure 23:
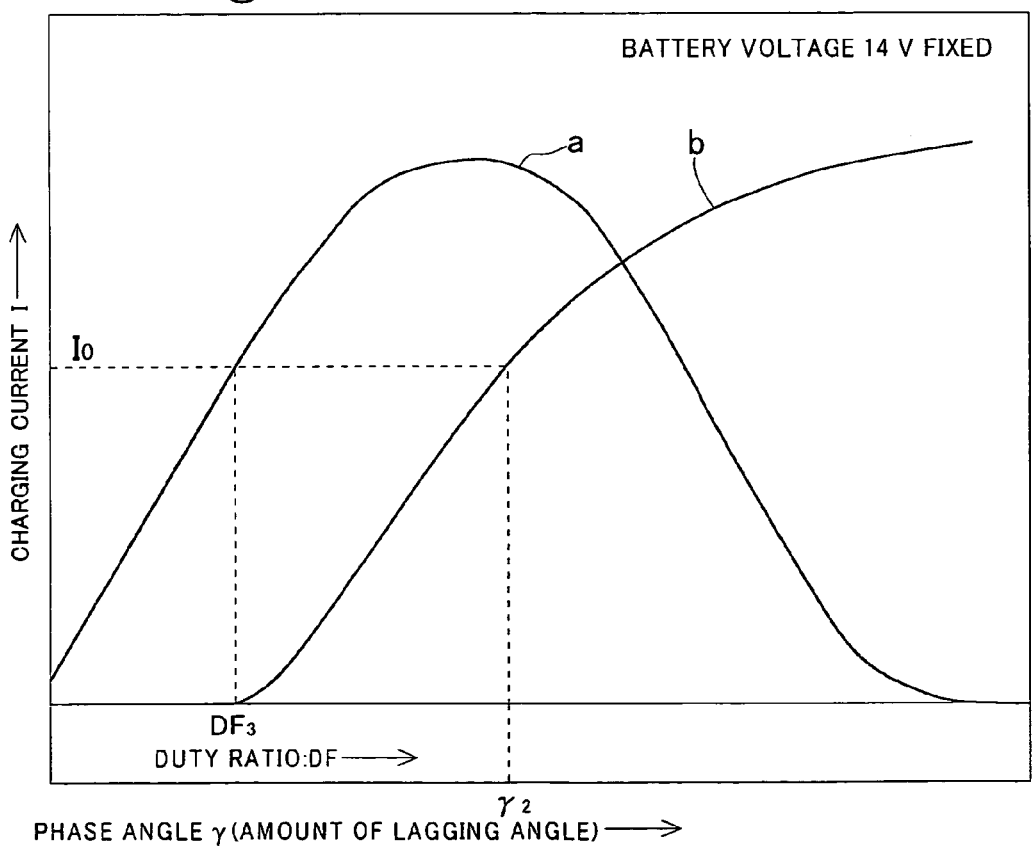
FIG. 23 is a graph of a charging current to duty ratio characteristic and a charging current to phase angle characteristic at a set speed.

In the embodiment, a map that provides the charging current I to duty ratio DF characteristic of the curve a in FIG. 23 is stored in the nonvolatile memory of the microprocessor as a duty ratio/charging current arithmetical operation map. A map that provides the charging current I to control angle γ of the curve b in FIG. 23 is stored in the nonvolatile memory of the microprocessor as a phase angle/charging current arithmetical operation map.

In the state of controlling the output of the magneto generator by the chopper control, when the rotational speed increases to the set speed N1, the duty ratio/charging current arithmetical operation map that provides the characteristic of the curve a in FIG. 23 is retrieved relative to the present duty ratio DF3 of the chopper control to arithmetically operate the present charging current I0. Then, the phase angle arithmetical operation map that provides the characteristic of the curve b in FIG. 23 is retrieved relative to the charging current I0 to arithmetically operate the phase angle γ2 of the AC control voltage required for the charging current to be I0 before and after the control mode is switched. With the phase angle being an initial value, the control of the output of the magneto generator is moved from the chopper control to the drive control.

In the state of controlling the output of the magneto generator by the drive control, when the rotational speed decreases to the set speed N1, the phase angle/charging current arithmetical operation map that provides the characteristic of the curve b in FIG. 23 is retrieved relative to the present phase angle γ2 of the chopper control to arithmetically operate the present charging current I0. Then, the duty ratio/charging current arithmetical operation map that provides the characteristic of the curve a in FIG. 23 is retrieved relative to the charging current I0 to arithmetically operate the duty ratio DF3 of the chopper control required for the charging current to be I0 before and after the control mode is switched. With the duty ratio being an initial value, the control is switched to the chopper control.

Figure 6:
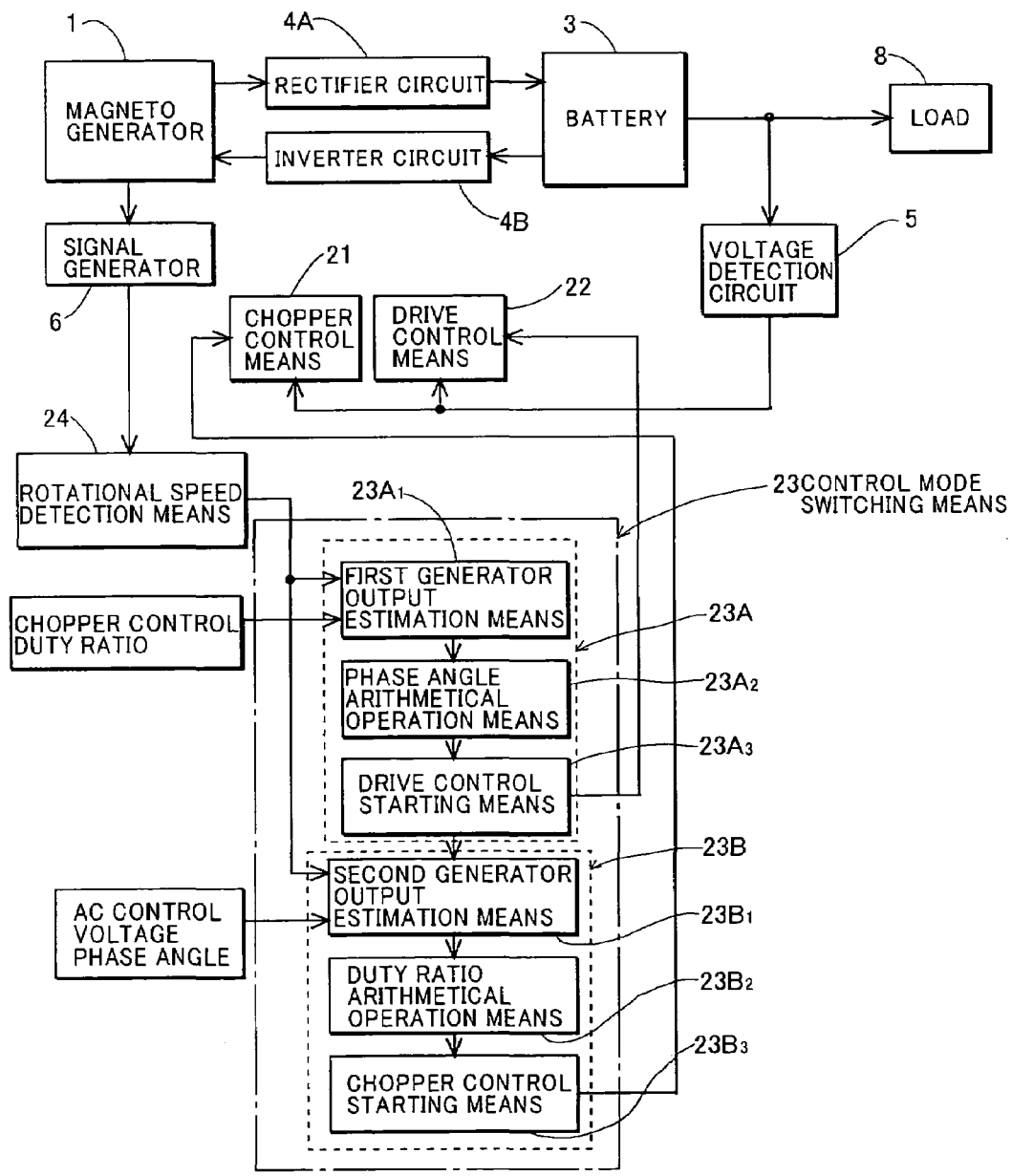
FIG. 6 is a block diagram of a further specific construction example of the control unit according to the embodiment in FIG. 5.

FIG. 6 shows a construction example of the generating device that can switch the control mode without changing the charging current as described above. In FIG. 6, the same parts as in FIG. 5 are denoted by the same reference numerals. In this example, the voltage detection circuit 5 is provided as an output detection circuit that detects the output of the magneto generator. Also, rotational speed detection means 24 that detects a rotational speed of the rotor of the magneto generator 1 from an interval between output pulses generated by the signal generating device 6.

The rotational speed detection means 24 may be comprised of, for example, a timer that counts an interval when the pulse signal generating device 6B detects the leading edge in the rotational direction of the reluctor 12 to generate a first pulse (a time required for one turn of the magnet rotor 10), and rotational speed arithmetical operation means for arithmetically operating the rotational speed from the count of the timer.

In the example in FIG. 6, the control mode switching means 23 is comprised of chopper control/drive control switching means 23A and drive control/chopper control switching means 23B. The chopper control/drive control switching means 23A is comprised of first generator output estimation means 23A1 that estimates an output current of the magneto generator from a duty ratio of the chopper control when the rotational speed reaches the set speed in the control by the chopper control mode, phase angle arithmetical operation means 23A2 that determines a phase angle of the AC control voltage required for matching a current output by the magneto generator at the start of the control by the drive control mode with the output current estimated by the first generator output estimation means, and drive control starting means 23A3 that starts the control by the drive control mode with the phase angle arithmetically operated by the phase angle arithmetical operation means being an initial value of the phase angle of the AC control voltage.

The drive control/chopper control switching means 23B is comprised of second generator output estimation means 23B1 that estimates an output current of the magneto generator from a phase angle of the drive control when the rotational speed reaches the set speed in the control by the drive control mode, duty ratio arithmetical operation means 23B2 that determines a duty ratio of the chopper control required for matching the current output by the magneto generator at the start of the control by the chopper control mode with the output current estimated by the second generator output estimation means 23B1, and chopper control starting means 23B3 that starts the control by the chopper control mode with the duty ratio arithmetically operated by the duty ratio arithmetical operation means being an initial value of the duty ratio of the chopper control.

Such a construction can prevent the change of the output current of the generator when the control mode is switched from the chopper control mode to the drive control mode and from the drive control mode to the chopper control mode, thereby preventing unstable control or the change of the rotational speed of the generator when the control mode is switched.

As described above, the output current of the magneto generator is estimated from the duty ratio of the chopper control when the control mode is switched from the chopper control mode to the drive control mode, and the output current of the magneto generator is estimated from the phase angle of the AC control voltage of the drive control when the mode is switched from the drive control mode to the chopper control mode. This can eliminate a detector that detects the output current of the magneto generator to provide a simple construction.

Figure 10:
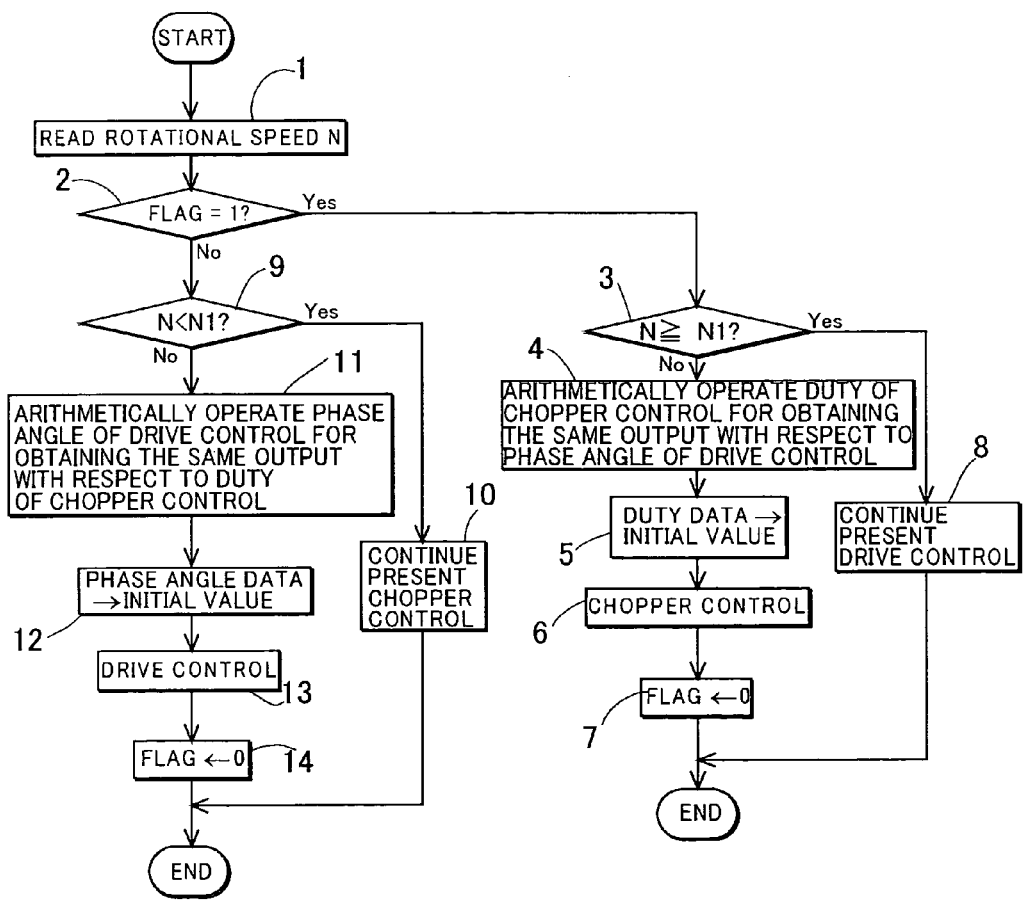
FIG. 10 is a flowchart of an algorithm of a program executed by a microprocessor for constructing control mode switching means in the first embodiment of the invention.

FIG. 10 shows a flowchart of an algorithm of essential portions of a program executed by the microprocessor when the control mode switching means 23 is comprised as in FIG. 6. A routine in FIG. 10 is executed at sufficiently short regular time intervals. When the routine is started, in Step 1, the rotational speed N is first read, and it is determined in Step 2 whether a flag is set to 1 (whether the drive control is performed). When it is determined that the flag is not set to 1, the process proceeds to Step 3, and it is determined whether the rotational speed N is the set speed N1 or higher. When it is determined that the rotational speed N is not the set speed N1 or higher (is lower than the set speed N1), the process proceeds to Step 4, and the map in FIG. 23 is retrieved relative to a present phase angle (immediately before the control mode is switched) of the drive control to estimate a present charging current of the battery (the output current of the generator), and at a start of chopper control to be performed, a duty ratio of the chopper control required for passing a charging current equal to the estimated charging current is arithmetically operated.

Then, the process proceeds to Step 5, the duty ratio arithmetically operated in Step 4 is set as an initial value of the duty ratio of the chopper control, and the chopper control is started in Step 6. Then, in Step 7, the flag is set to 0 to finish the routine. When it is determined in Step 3 that the rotational speed N is the set speed N1 or higher, the process proceeds to Step 8, and the present drive control is continued to finish the routine.

When it is determined in Step 2 of the routine in FIG. 10 that the flag is 0 (the chopper control is now being performed), the process proceeds to Step 9, and it is determined whether the rotational speed N is lower than the set speed. When it is determined that the rotational speed is lower than the set speed N1, the process proceeds to Step 10, and the present chopper control is continued to finish the routine.

When it is determined in Step 9 that the rotational speed N is not lower than the set speed (is the set speed or higher), the process proceeds to Step 11, and the map in FIG. 23 is used to estimate a present charging current of the battery (the output current of the magneto generator) from a present duty ratio of the chopper control, and at a start of drive control to be performed, a phase angle $\gamma$ of the AC control voltage required for passing a charging current equal to the estimated charging current is arithmetically operated. Then, the phase angle $\gamma$ arithmetically operated in Step 11 is set as an initial value of the drive control in Step 12, and the drive control is started in Step 13. Then, in Step 14, the flag is set to 1 to finish the routine.

According to the algorithm in FIG. 10, the first generator output estimation means 23A1 is constructed by Step 9 and a step in which the charging current is estimated from the duty ratio in Step 11, and the phase angle arithmetical operation means 23A2 is constructed by a step in which the phase angle is arithmetically operated with respect to the estimated charging current in Step 11. The drive control starting means 23A3 is constructed by Steps 12 and 13. Further, the second generator estimation means 23B1 is constructed by Step 3 and a step in which the charging current is estimated from the phase angle in Step 4, and the duty ratio arithmetical operation means 23B2 is constructed by a step in which the duty ratio is arithmetically operated with respect to the estimated charging current in Step 4. The chopper control starting means 23B3 is constructed by Steps 5 and 6.

In performing the drive control, it is needed to determine the reference phase of the AC control voltage (the phase of the no-load induced voltage of the armature coil) in order to generate the AC control voltage by the inverter circuit 4B, but it is difficult to detect the phase of the no-load induced voltage during the operation of the generator. Thus, in the embodiment, the signal generating device 6 is provided that includes the signal generating rotor 6A having the reluctor that rotates with the magnet rotor, and the pulse signal generator 6B that detects the edge of the reluctor of the signal generating rotor to generate the pulses, and the drive control means is comprised so that the phase of the no-load induced voltage of the armature coil is detected as the reference phase from the pulses output by the signal generating device to determine the phase angle of the AC control voltage with respect to the reference phase.

Actually, the timer is actuated at timing when the pulse signal generating device 6B generates a specific pulse (a pulse generated at timing having a fixed phase relationship to a zero point in moving from a negative half wave to a positive half wave of the no-load induced voltage) to measure a predetermined time, and thus detect timing having a predetermined phase angle $\gamma$ with respect to the zero point (the reference phase) in moving from the negative half wave to the positive half wave of the no-load induced voltage of the armature coil of each phase, and the switch elements Qu to Qw and Qx to Qz of the inverter circuit 4B are controlled so as to generate an AC voltage whose zero point matches this timing to generate an AC control voltage having the predetermined phase angle $\gamma$.

As described above, the AC control voltage having the predetermined phase angle is generated with respect to the output of the signal generating device comprised of the rotor having the reluctor and the pulse signal generator, which allows the AC control voltage having the predetermined phase angle to be generated without using a semiconductor sensor susceptible to heat, and is advantageous in driving the magneto generator by the internal combustion engine.

Figure 2:
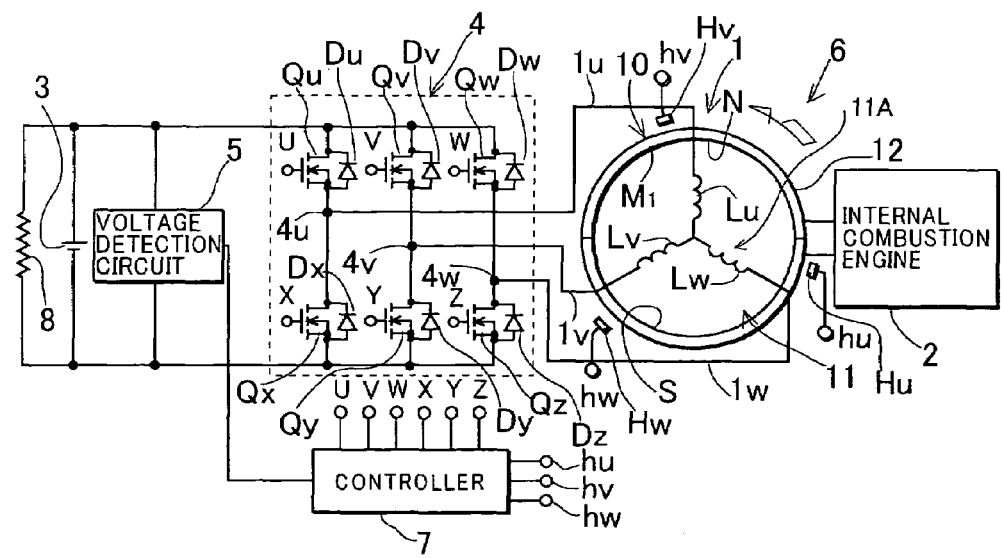
FIG. 2 is a circuit diagram of another construction example of hardware of a generating device according to the invention.

However, the invention is not limited to the case of using the signal generating device comprised of the rotor having the reluctor and the pulse signal generator as described above, but for example, as shown in FIG. 2, position sensors Hu to Hw may be provided that are constituted by hall ICs that detect a polarity of a magnetic pole of the magnet rotor relative to the armature coil of each phase of the magneto generator 1 and output detection signals having different levels depending on the polarity of the magnetic pole detected, and the drive control means may be comprised so that the phase of the no-load induced voltage of the armature coil is detected as the reference phase from detection signals hu to hw output by the position sensors to determine the phase angle of the AC control voltage with respect to the reference phase.

Second Embodiment

As described above, when the control mode is switched from the chopper control mode to the drive control mode, the charging current is estimated from the duty ratio of the chopper control to arithmetically operate the initial value of the phase angle of the AC control voltage of the drive control required for passing the charging current equal to the estimated charging current, while when the control mode is switched from the drive control mode to the chopper control mode, the charging current is estimated from the phase angle of the AC control voltage of the drive control to arithmetically operate the initial value of the duty ratio of the chopper control required for passing the charging current equal to the estimated charging current. This eliminates the need for providing a current detection circuit that detects the charging current of the battery when the voltage across the battery (the output voltage of the generator) is detected to control to keep the detected voltage at the target value, which provides a simple construction.

However, the invention is not limited to such a construction, but may be comprised so as to detect the charging current of the battery when the control mode is switched, and arithmetically operate, from the detection value, the initial value of the duty ratio of the chopper control or the initial value of the phase angle of the AC control voltage of the drive control to be performed after the switching. In the case where the charging current of the battery is detected to arithmetically operate, from the detection value, the initial value of the duty ratio and the initial value of the phase angle, a current detector 13 that detects the output current of the generator may be provided as shown in FIG. 3 to arithmetically operate the initial value of the duty ratio at the start of the chopper control and the initial value of the phase angle at the start of the drive control based on detection signal obtained from the current detector.

Figure 3:
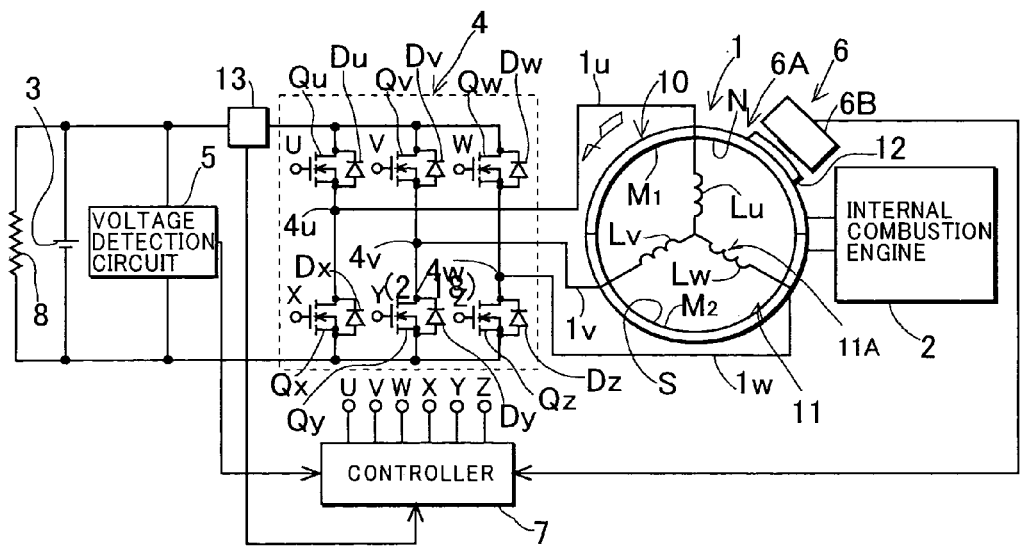
FIG. 3 is a circuit diagram of a further construction example of hardware of a generating device according to the invention.
Figure 7:
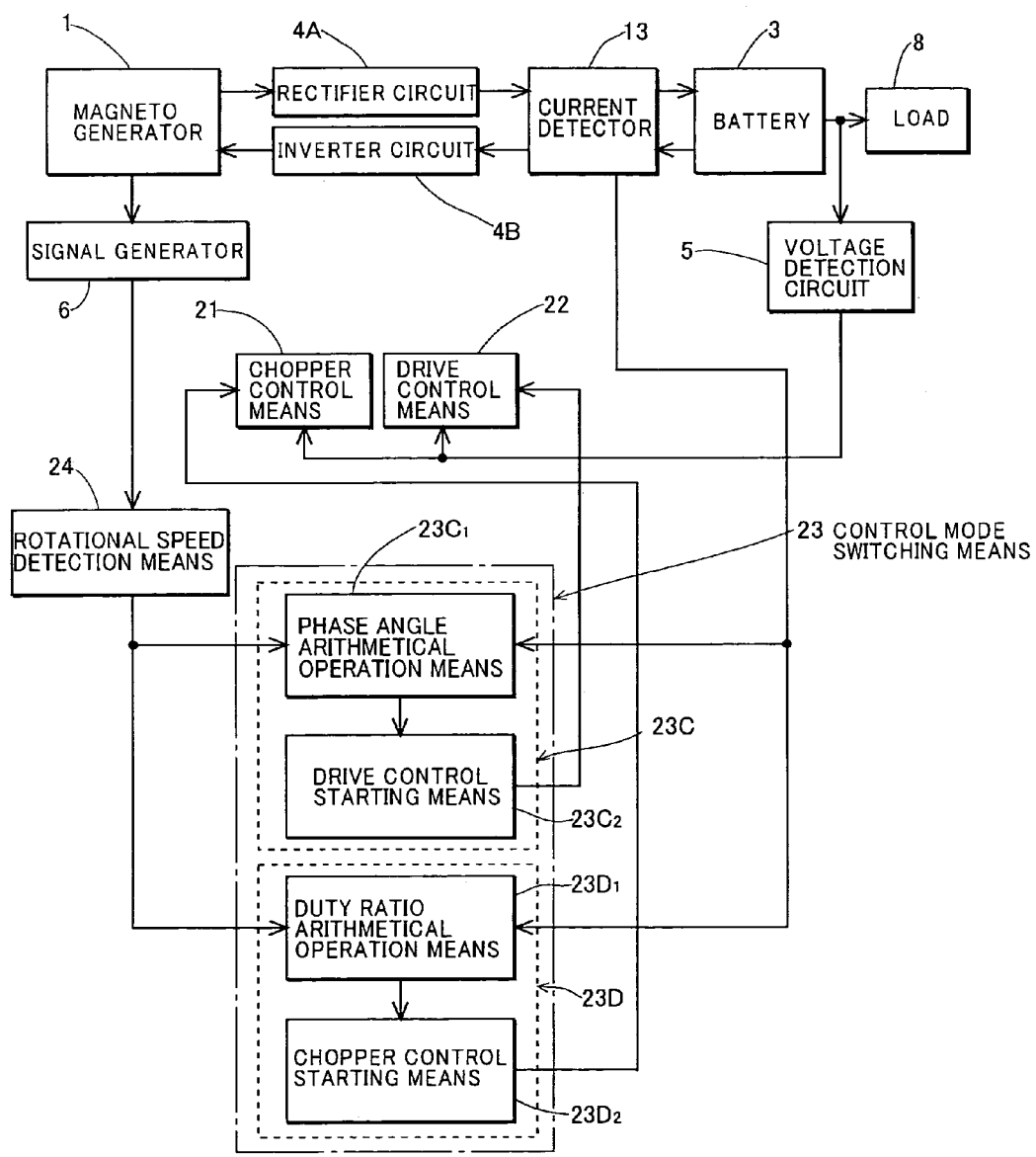
FIG. 7 is a block diagram of a construction of a control unit according to a second embodiment of the invention.

FIG. 7 shows a construction of control mode switching means when the current detector 13 is provided as shown in FIG. 3 to arithmetically operate the initial value of the duty ratio at the start of the chopper control and the initial value of the phase angle at the start of the drive control based on the output current of the generator detected by the current detector 13.

In the example in FIG. 7, the control mode switching means 23 is comprised of chopper control/drive control switching means 23C including phase angle arithmetical operation means 23C1 that arithmetically operates a phase angle of the AC control voltage required for outputting a current equal to a current output by the magneto generator when the rotational speed reaches the set speed in the control by the chopper control mode, from the magneto generator at the start of control by the drive control mode, and drive control starting means 23C2 that starts the control by the drive control mode with the phase angle arithmetically operated by the phase angle arithmetical operation means being an initial value of the phase angle of the AC control voltage; and drive control/chopper control switching means 23D including duty ratio arithmetical operation means 23D1 that arithmetically operates a duty ratio of the chopper control required for outputting a current equal to a current output by the magneto generator when the rotational speed reaches the set speed in the control by the drive control mode, from the magneto generator at the start of control by the chopper control mode, and chopper control starting means 23D2 that starts the control by the chopper control mode with the duty ratio arithmetically operated by the duty ratio arithmetical operation means 23D1 being an initial value.

Specifically, in the example in FIG. 7, the rotational speed of the magneto generator 1 detected by the rotational speed detection means 24 and the current value detected by the current detector 13 are provided to the phase angle arithmetical operation means 23C1, and the chopper control/drive control switching means 23C is comprised of the phase angle arithmetical operation means and the drive control starting means 23C2. Also, the rotational speed detected by the rotational speed detection means 24 and the current value detected by the current detector 13 are provided to the duty ratio arithmetical operation means 23D1, and the drive control/chopper control switching means 23D is comprised of the duty ratio arithmetical operation means 23D1 and the chopper control starting means 23D2.

The phase angle arithmetical operation means 23C1 retrieves the map prepared based on the curve b in FIG. 23 relative to the current value detected by the current detector 13 when the rotational speed of the magneto generator matches the set speed N1, to arithmetically operate the phase angle γ of the AC control voltage required for matching the output current of the magneto generator when the control mode is switched to the drive control mode with the present output current detected by the output detection circuit. The drive control starting means 23C2 starts the control by the drive control mode with the phase angle arithmetically operated by the phase angle arithmetical operation means 23C1 being the initial value of the AC control voltage.

The duty ratio arithmetical operation means 23D1 retrieves the map prepared based on the curve a in FIG. 23 relative to the current value detected by the current detector 13 when the rotational speed matches the set speed N1, to arithmetically operate the duty ratio DF of the chopper control required for matching the output current of the magneto generator when the mode is switched to the chopper control mode with the present output current detected by the current detector. The chopper control starting means 23D2 starts the control by the chopper control mode with the duty ratio arithmetically operated by the duty ratio arithmetical operation means being the initial value.

Such a construction can prevent the change of the output current of the generator from changing when the control mode is switched from the chopper control mode to the drive control mode and from the drive control mode to the chopper control mode, thereby preventing unstable control or an abrupt change of load torque of a motor causing a change of the rotational speed when the control mode is switched.

Figure 11:
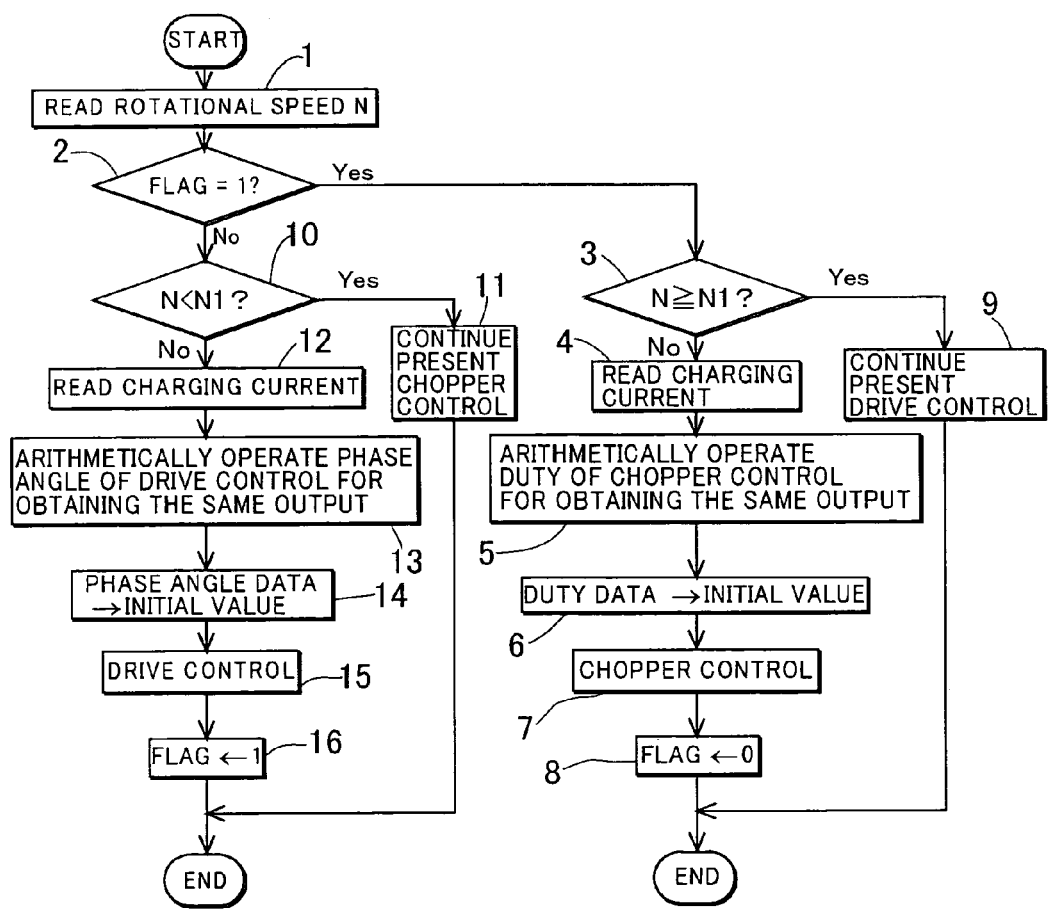
FIG. 11 is a flowchart of an algorithm of a program executed by a microprocessor for constructing control mode switching means in the second embodiment of the invention.

FIG. 11 shows a flowchart of an algorithm of essential portions of a program executed by the microprocessor when the control mode switching means is comprised as in FIG. 7. According to the algorithm in FIG. 11, in Step 1, the rotational speed N is first read, and it is determined in Step 2 whether the flag is set to 1 (whether the drive control is performed). When it is determined that the flag is set to 1, the process proceeds to Step 3, and it is determined whether the rotational speed N is the set speed N1 or higher. When it is determined that the rotational speed N is not the set speed N1 or higher (is lower than the set speed), the process proceeds to Step 4, and the charging current detected by the current detector 13 is read. Then, the process proceeds to Step 5, the map in FIG. 23 is retrieved relative to the read charging current to arithmetically operate a duty ratio of the chopper control required for passing a charging current equal to the present charging current at a start of chopper control to be performed.

Then, the duty ratio arithmetically operated in Step 5 is set as an initial value of the duty ratio of the chopper control in Step 6, and the chopper control is started in Step 7. Then, in Step 8, the flag is set to 0 to finish the routine. When it is determined in Step 3 that the rotational speed N is the set speed N1 or higher, the process proceeds to Step 9, and the present chopper control is continued to finish the routine.

When it is determined in Step 2 of the routine in FIG. 11 that the flag is 0 (the chopper control is now being performed), the process proceeds to Step 10, and it is determined whether the rotational speed N is lower than the set speed N1. When it is determined that the rotational speed is lower than the set speed N1, the process proceeds to Step 11, and the present chopper control is continued to finish the routine.

When it is determined in Step 10 that the rotational speed N is not lower than the set speed N1 (is the set speed or higher), the process proceeds to Step 12, and the charging current detected by the current detector is read. Then, the process proceeds to Step 13, and the map in FIG. 23 is retrieved relative to the read charging current to arithmetically operate a phase angle γ of the AC control voltage required for passing a charging current equal to the present charging current (immediately before the control mode is switched) at a start of drive control to be performed (immediately after the control mode is switched). Then, the process proceeds to Step 14, and the phase angle γ arithmetically operated in Step 13 is set as an initial value of the drive control, and the drive control is started in Step 15. Then, in Step 16, the flag is set to 1 to finish the routine.

According to the algorithm in FIG. 11, the phase angle arithmetical operation means 23C1 in FIG. 7 is constructed by Steps 10 to 13, and the drive control starting means 23C2 is constructed by Steps 14 and 15. Further, the duty ratio arithmetical operation means 23D1 is constructed by Steps 3 to 5, and the chopper control starting means 23D2 is constructed by Steps 6 and 7.

Third Embodiment

In a third embodiment of the invention, control mode switching means 23 is comprised so as to switch the control mode to the drive control mode when the rotational speed becomes higher than the set speed, the output of the magneto generator 1 becomes lower than a set value, and the duty ratio of the chopper control reaches a value that maximizes the output current of the magneto generator 1, in a state where the rotational speed of the magneto generator 1 is lower than the set speed N1 in the control by the chopper control mode, and to switch the control mode to the chopper control mode when the rotational speed becomes lower than the set speed N1, the output of the magneto generator becomes lower than the set value, and the phase angle of the AC control voltage reaches a value that maximizes the output current of the magneto generator, in a state where the rotational speed is the set speed or higher in the control by the drive control mode.

Figure 8:
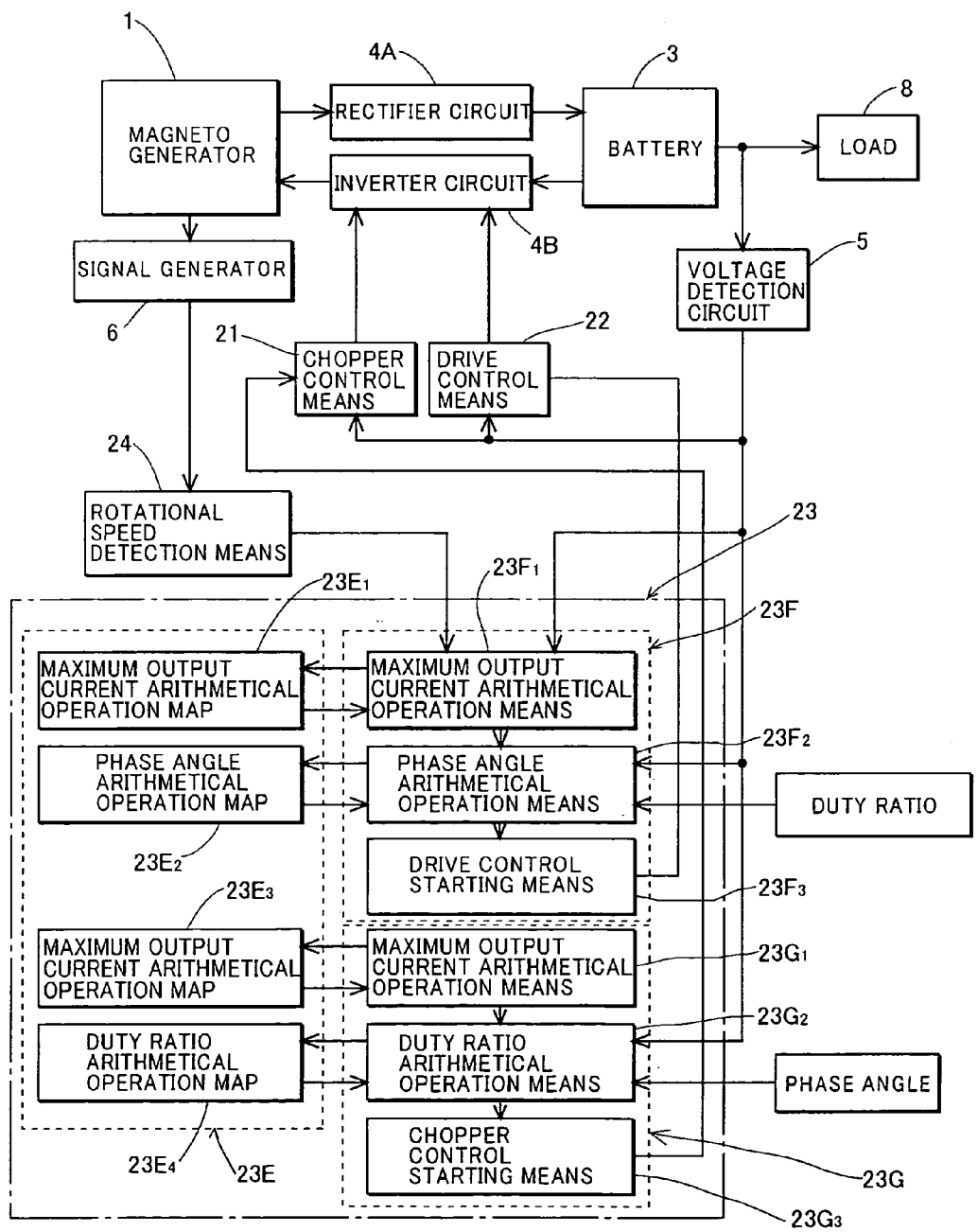
FIG. 8 is a block diagram of a construction of a control unit according to third and fourth embodiments of the invention.

FIG. 8 shows a construction example of the control mode switching means 23. In this example, the control mode switching means 23 is comprised of map storage means 23E, chopper control/drive control switching means 23F, and drive control/chopper control switching means 23G.

Figure 24:
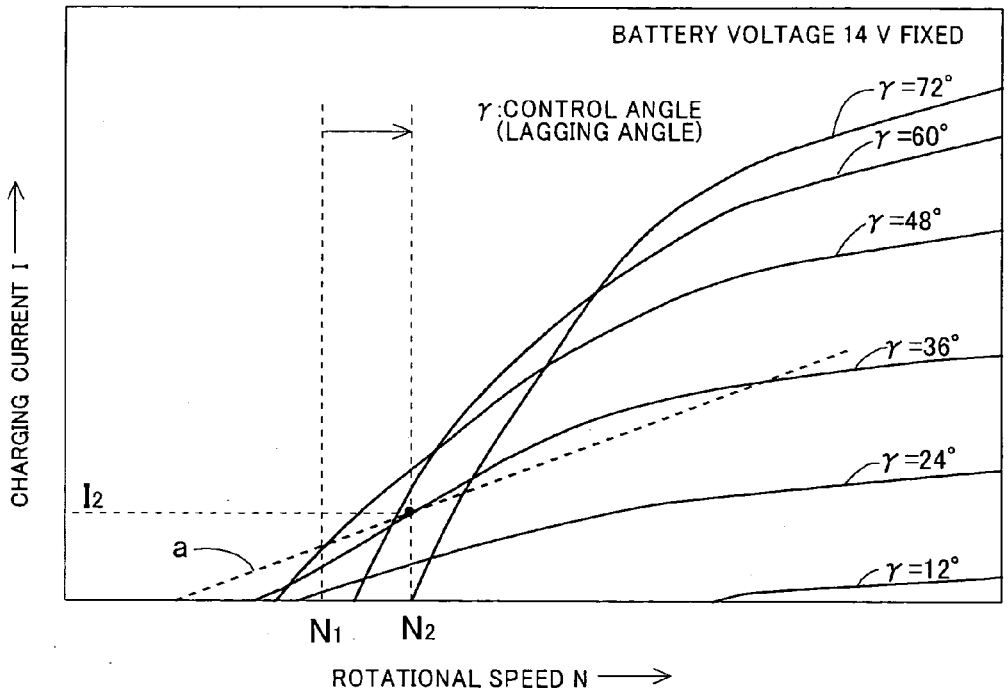
FIG. 24 is a graph of a characteristic of a map used in the embodiment of the invention.
Figure 25:
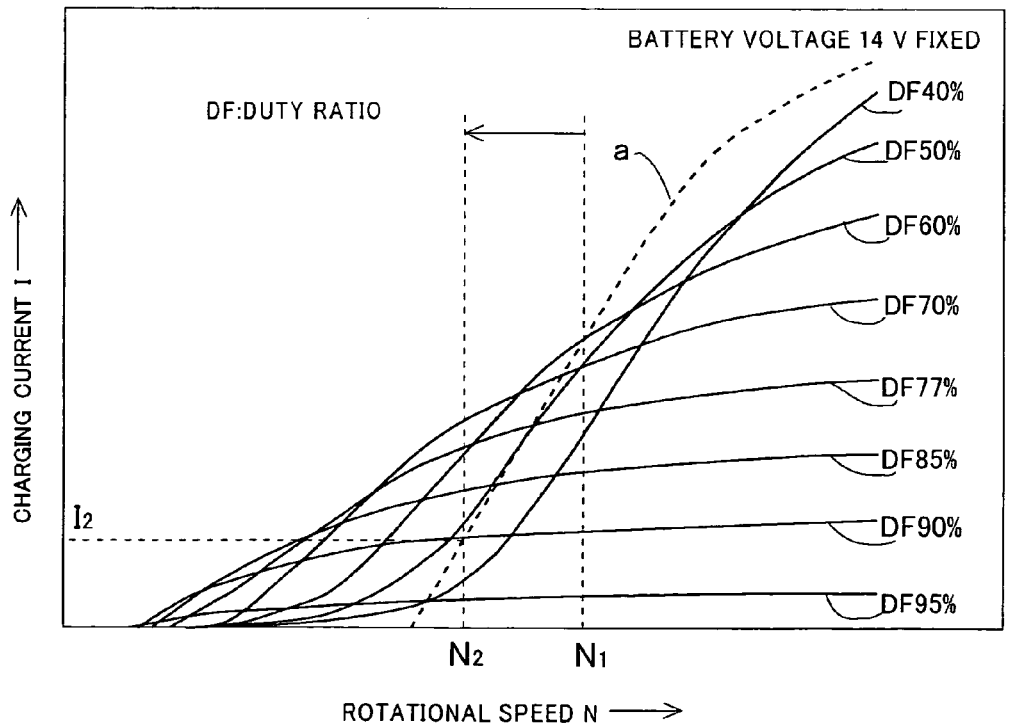
FIG. 25 is a graph of a characteristic of another map used in the embodiment of the invention.

The map storage means 23E stores a chopper control maximum output current arithmetical operation map 23E1 used for arithmetically operating, from a relationship of a curve a shown by a broken line in FIG. 24, a maximum current output by the magneto generator at each rotational speed in the chopper control; a phase angle arithmetical operation map 23E2 that provides a relationship between the rotational speed of the magneto generator, the output current of the magneto generator, and the phase angle of the AC control voltage of the drive control, as shown by a solid line in FIG. 24; a drive control maximum output current arithmetical operation map 23E3 used for arithmetically operating, from a curve a shown by a broken line in FIG. 25, a maximum current output by the magneto generator at each rotational speed in the drive control; and a duty ratio arithmetical operation map 23E4 that provides a relationship between the rotational speed of the magneto generator, the output current of the magneto generator, and the duty ratio of the chopper control, as shown by a solid line in FIG. 25, The curve a shown by the broken line in FIG. 24 is a maximum charging current curve of the chopper control showing a maximum charging current obtained at each rotational speed in the chopper control, and a group of curves shown by solid lines in FIG. 24 show a charging current to rotational speed characteristic in the drive control with the phase angles of the AC control voltage taken as parameters.

The curve a shown by the broken line in FIG. 25 is a maximum charging current curve of the drive control showing a maximum charging current obtained at each rotational speed in the drive control, and a group of curves shown by solid lines in FIG. 25 show a charging current to rotational speed characteristic in the chopper control with the duty ratios of the chopper control taken as parameters.

The chopper control/drive control switching means 23F is comprised of chopper control maximum output current arithmetical operation means 23F1 that retrieves the chopper control maximum output current arithmetical operation map 23E1 relative to the rotational speed to arithmetically operate the maximum current output by the magneto generator when a first control mode switching condition is met, the first control mode switching condition being such that the rotational speed becomes higher than the set speed N1, the output of the magneto generator becomes lower than the set value, and the duty ratio of the chopper control reaches the value that maximizes the output current of the magneto generator, in the control by the chopper control mode; phase angle arithmetical operation means 23F2 that retrieves the phase angle arithmetical operation map 23E2 relative to the maximum output current arithmetically operated by the chopper control maximum output current arithmetical operation means and the rotational speed to arithmetically operate a phase angle of the AC control voltage required for outputting a current equal to the maximum output current from the magneto generator at the start of the drive control; and drive control starting means 23F3 that starts the control by the drive control mode with the phase angle arithmetically operated by the phase angle arithmetical operation means 23F2 being an initial value of the phase angle of the AC control voltage.

The drive control/chopper control switching means 23G is comprised of drive control maximum output current arithmetical operation means 23G1 that retrieves the drive control maximum output current arithmetical operation map 23E3 relative to the rotational speed to arithmetically operate the maximum current output by the magneto generator when a second control mode switching condition is met, the second control mode switching condition being such that the rotational speed becomes lower than the set speed N1, the output of the magneto generator becomes lower than the set value, and the phase angle of the drive control reaches the value that maximizes the output current of the magneto generator, in the control by the drive control mode; duty ratio arithmetical operation means 23G2 that retrieves the duty ratio arithmetical operation map 23E4 relative to the maximum output current arithmetically operated by the drive control maximum output current arithmetical operation means and the rotational speed to arithmetically operate a duty ratio of the chopper control required for outputting a current equal to the maximum output current from the magneto generator at the start of the chopper control; and chopper control starting means 23G3 that starts the control by the chopper control mode with the duty ratio arithmetically operated by the duty ratio arithmetical operation means 23G2 being an initial value of the duty ratio of the chopper control.

Figure 12:
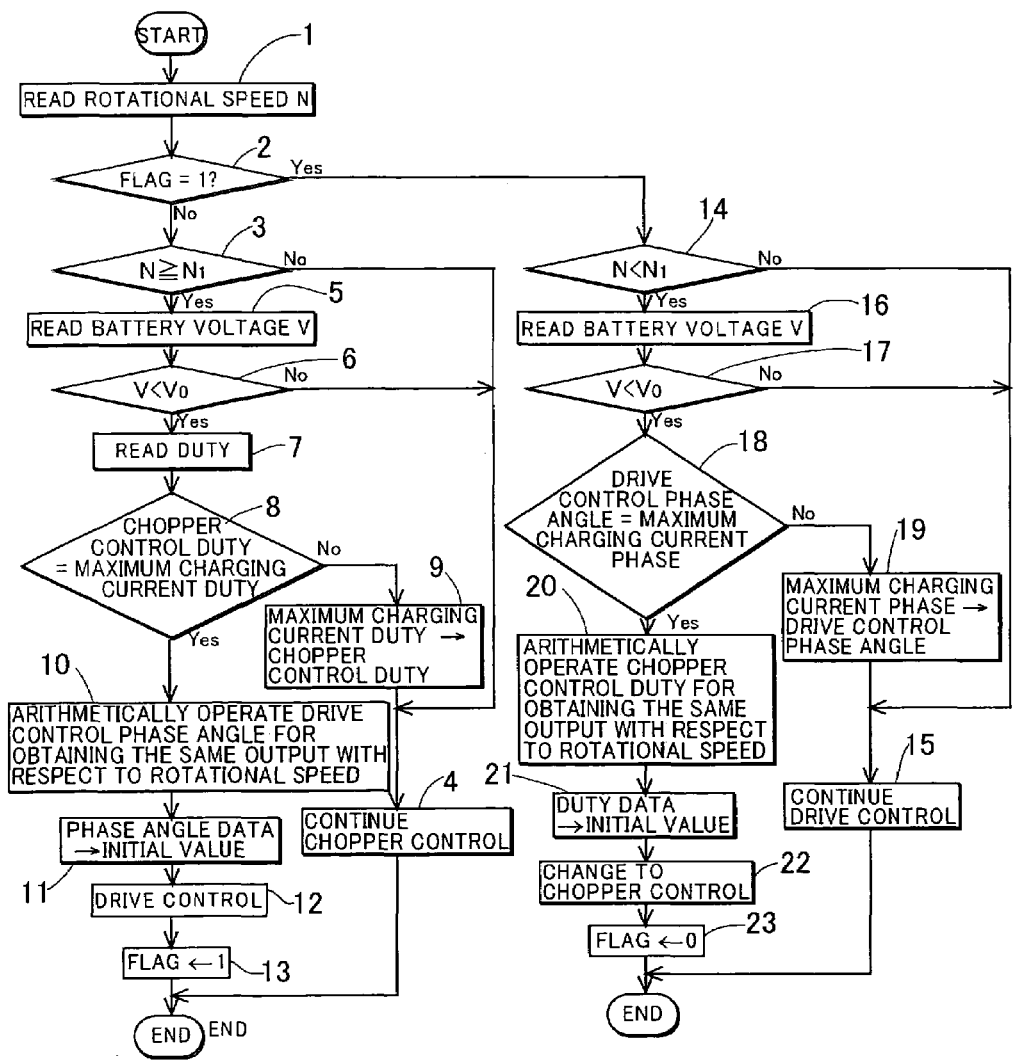
FIG. 12 is a flowchart of an algorithm of a program executed by a microprocessor for constructing control mode switching means in the third embodiment of the invention.

FIG. 12 shows an algorithm of essential portions of a program executed by the microprocessor when the control mode switching means is comprised as in FIG. 8. According to this algorithm, in Step 1, the rotational speed N is first read, and it is determined in Step 2 whether the flag is set to 1. When it is determined that the flag is not 1 (when the chopper control is performed), the process proceeds to Step 3, and it is determined whether the rotational speed N is the set speed N1 or higher. When it is determined that the rotational speed is not the set speed or higher (is lower than the set speed N1), the process proceeds to Step 4, and the chopper control is continued to finish the routine. When it is determined in Step 3 that the rotational speed N is the set speed N1 or higher, the process proceeds to Step 5, a battery voltage (output) V detected by the voltage detection circuit 5 is read, and it is determined in Step 6 whether the battery voltage V is lower than a set value V0. When it is determined that the battery voltage is lower than the set value, the duty ratio of the present chopper control is read in Step 7. Then, it is determined in Step 8 whether the read duty ratio is a duty ratio that maximizes the charging current (a maximum charging current duty ratio). When it is determined that the duty ratio is not the maximum charging current duty ratio, the process moves to Step 9, and the maximum charging current duty ratio is set to the duty ratio of the chopper control. Then, the process proceeds to Step 4 to continue the chopper control.

When it is determined that the duty ratio is the maximum charging current duty ratio in Step 8, the process proceeds to Step 10, the maximum charging current arithmetical operation map that is the map of the maximum charging current curve a of the chopper control in FIG. 24 is retrieved relative to the rotational speed N to determine the present charging current, and the phase angle arithmetical operation map that provides the relationship between the rotational speed, the charging current, and the phase angle of the AC control voltage is retrieved relative to the determined charging current and the rotational speed, to arithmetically operate the phase angle of the AC control voltage required for passing the charging current equal to the present charging current at the start of the drive control.

Then, the process proceeds to Step 11, and the arithmetically operated phase angle is set as the initial value of the phase angle in the drive control. After the drive control is started in Step 12, the flag is set to 1 in Step 13 to finish the routine.

For example, in FIG. 24, in the case where the battery voltage becomes lower than the set value V0 and the duty ratio of the chopper control becomes maximum when the rotational speed increases to N2 in the chopper control, the charging current arithmetical operation map that is the map of the maximum charging current curve a is retrieved relative to the rotational speed N2 to determine a present charging current I2, and the phase angle arithmetical operation map that is the map of the group of curves shown by the solid lines in FIG. 24 is retrieved relative to the rotational speed N2 and the charging current I2 to arithmetically operate a phase angle γ (36° in the shown example) of the AC control voltage required for passing the same charging current I2 at the start of the drive control. The drive control is started with this phase angle being the initial value.

When it is determined in Step 2 in FIG. 12 that the flag is set to 1 (when the drive control is performed), the process moves to Step 14, and it is determined whether the rotational speed N is lower than the set speed N1. When it is determined that the rotational speed is not lower than the set speed (is the set speed N1 of higher), the process proceeds to Step 15, and the drive control is continued to finish the routine. When it is determined in Step 14 that the rotational speed N is lower than the set speed N1, the process proceeds to Step 16, the battery voltage (output) V detected by the voltage detection circuit 5 is read, and it is determined in Step 17 whether the battery voltage V is lower than the set value V0. When it is determined that the battery voltage is lower than the set value, it is determined in Step 18 whether the phase angle of the AC control voltage of the drive control now being performed is a value that maximizes the output current of the magneto generator (a maximum charging current phase angle). When it is determined that the phase angle is not the maximum charging current phase angle, the maximum charging current phase angle is set to the phase angle of the AC control voltage in Step 19. Then, the process proceeds to Step 15 to continue the drive control.

When it is determined in Step 18 that the phase angle is the maximum charging current phase angle, the process proceeds to Step 20, the drive control maximum charging current arithmetical operation map that is the map of the maximum charging current curve a of the drive control in FIG. 25 is retrieved relative to the rotational speed N to determine the maximum charging current (the charging current that may be now passing), and the duty ratio arithmetical operation map that provides a relationship between the rotational speed, the charging current, and the duty ratio of the chopper control is retrieved relative to the determined maximum charging current and the rotational speed to arithmetically operate the duty ratio of the chopper control required for passing the charging current equal to the present charging current at the start of the chopper control. Then, the process proceeds to Step 21, and the arithmetically operated duty ratio is set as the initial value of the duty ratio in the chopper control. After the chopper control is started in Step 22, the flag is set to 0 in Step 23 to finish the routine.

For example, in the case where the battery voltage becomes lower than the set value V0 and the phase angle of the AC control voltage of the drive control becomes the maximum charging current phase angle when the rotational speed decreases to N2 in FIG. 25 in the drive control, the charging current arithmetical operation map that is the map of the drive control maximum charging current curve a is retrieved relative to the rotational speed N2 to determine the present charging current I2, and the duty ratio arithmetical operation map that is the map of the group of curves shown by the solid lines in FIG. 25 is retrieved relative to the rotational speed N2 and the charging current I2 to arithmetically operate a duty ratio DF (90% in the shown example) of the chopper control required for passing the same charging current I2 at the start of the chopper control. The chopper control is started with the duty ratio being the initial value.

According to the algorithm in FIG. 12, the chopper control maximum output current arithmetical operation means 23F1 is constructed by a step in which the maximum output current arithmetical operation map 23E1 is retrieved relative to the rotational speed to arithmetically operate the maximum charging current in Step 10, and the phase angle arithmetical operation means 23F2 is constructed by a step in which the phase angle arithmetical operation map 23E2 is used to arithmetically operate the phase angle in Step 10. The drive control starting means 23F3 is constructed by Steps 11 and 12.

The drive control maximum output current arithmetical operation means 23G1 is constructed by a step in which the maximum output current arithmetical operation map 23E3 is retrieved relative to the rotational speed to arithmetically operate the maximum charging current in Step 20, and the duty ratio arithmetical operation means 23G2 is constructed by a step in which the duty ratio arithmetical operation map 23E4 is used to arithmetically operate the duty ratio in Step 20. The chopper control starting means 23G3 is constructed by Steps 21 and 22.

Fourth Embodiment

In the above described third embodiment, the phase angle γ of the AC control voltage when the control is switched from the chopper control to the drive control, and the duty ratio of the chopper control when the control is switched from the drive control to the chopper control are determined by map arithmetical operations. However, approximate expressions that express the characteristics in FIGS. 24 and 25 may be prepared, and the approximate expressions may be used to determine the phase angle γ of the AC control voltage when the control is switched from the chopper control to the drive control, and the duty ratio DF of the chopper control when the control is switched from the drive control to the chopper control. In this case, the construction of the generating device is the same as in FIG. 8.

Figure 13:
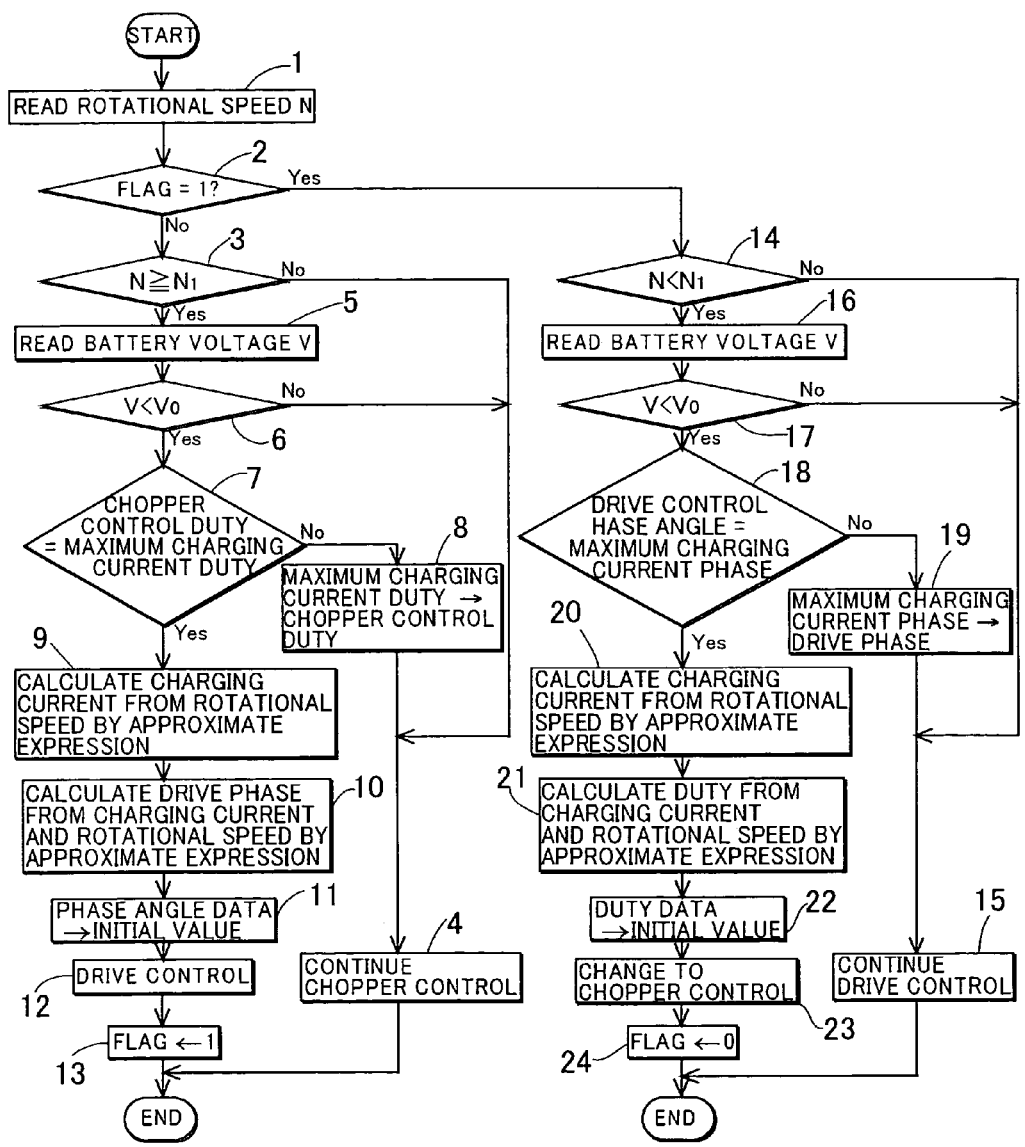
FIG. 13 is a flowchart of an algorithm of a program executed by a microprocessor for constructing control mode switching means in the fourth embodiment of the invention.

FIG. 13 shows a flowchart of an algorithm of essential portions of a program executed by the microprocessor in the case where approximate expressions are used to arithmetically operate the phase angle and the duty ratio when the control mode is switched. According to this algorithm, in Step 1, the rotational speed N is first read, and it is determined in Step 2 whether the flag is set to 1. When it is determined that the flag is not 1 (when the chopper control is performed), the process proceeds to Step 3, and it is determined whether the rotational speed N is the set rotational speed N1 or higher. When it is determined that the rotational speed is not the set speed or higher (is lower than the set speed N1), the process proceeds to Step 4, and the chopper control is continued to finish the routine. When it is determined in Step 3 that the rotational speed N is the set speed N1 or higher, the process proceeds to Step 5, the battery voltage (output) V detected by the voltage detection circuit 5 is read, and it is determined in Step 6 whether the battery voltage V is lower than the set value V0. When it is determined that the battery voltage is lower than the set value, it is determined in Step 7 whether the duty ratio of the chopper control now being performed is the maximum charging current duty ratio. When it is determined that the duty ratio is not the maximum charging current duty ratio, the process moves to Step 8, and the maximum charging current duty ratio is set to the duty ratio of the chopper control. Then, the process proceeds to Step 4 to continue the chopper control.

When it is determined in Step 7 that the duty ratio is the maximum charging current duty ratio, the process proceeds to Step 9, and an approximate expression showing the maximum charging current curve a of the chopper control in FIG. 24 is used to determine the maximum charging current as the present charging current relative to the rotational speed. Then, in Step 10, an approximate expression prepared based on the group of curves in FIG. 24 that provides the relationship between the rotational speed, the charging current, and the phase angle of the AC control voltage to arithmetically operate, relative to the rotational speed and the maximum charging current, the phase angle of the AC control voltage required for passing a charging current equal to the present charging current at the start of the drive control.

Then, the process proceeds to Step 11, and the arithmetically operated phase angle is set as the initial value of the phase angle in the drive control. After the drive control is started in Step 12, the flag is set to 1 in Step 13 to finish the routine.

When it is determined in Step 2 in FIG. 13 that the flag is set to 1 (the drive control is performed), the process moves to Step 14, and it is determined whether the rotational speed N is lower than the set rotational speed N1. When it is determined that the rotational speed is not lower than the set speed (is the set speed N1 of higher), the process proceeds to Step 15, and the drive control is continued to finish the routine. When it is determined in Step 14 that the rotational speed N is lower than the set speed N1, the process proceeds to Step 16, the battery voltage (output) V detected by the voltage detection circuit 5 is read, and it is determined in Step 17 whether the battery voltage V is lower than the set value V0. When it is determined that the battery voltage is lower than the set value, the process proceeds to Step 18, and it is determined whether the phase angle of the AC control voltage of the drive control now being performed is the value that maximizes the output current (the maximum charging current phase angle). When it is determined that the phase angle is not the maximum charging current phase angle, the maximum charging current phase angle is set to the phase angle of the AC control voltage in Step 19. Then, the process proceeds to Step 15 to continue the drive control.

When it is determined in Step 18 that the phase angle is the maximum charging current phase angle, the process proceeds to Step 20, and an approximate expression prepared based on the maximum charging current curve a of the drive control in FIG. 25 to determine the maximum charging current (the charging current that may be now passing) relative to the rotational speed N. Then, in step 21, an approximate expression prepared based on the characteristic in FIG. 25 that provides the relationship between the rotational speed, the charging current, and the duty ratio of the chopper control is used to arithmetically operate, relative to the charging current arithmetically operated in Step 20 and the rotational speed, the duty ratio of the chopper control required for passing a charging current equal to the charging current at the start of the chopper control.

Then, the process proceeds to Step 22, and the arithmetically operated phase angle is set as the initial value of the duty ratio in the chopper control. After the chopper control is started in Step 23, the flag is set to 0 in Step 24 to finish the routine.

According to the algorithm in FIG. 13, the chopper control maximum output current arithmetical operation means 23F1 in FIG. 8 is constructed by Step 9, and the phase angle arithmetical operation means 23F2 is constructed by Step 10. The drive control starting means 23F3 is constructed by Steps 11 and 12. Further, the drive control maximum output current arithmetical operation means 23G1 in FIG. 8 is constructed by Step 20, and the duty ratio arithmetical operation means 23G2 is constructed by Step 21. The chopper control starting means 23G3 is constructed by Steps 21 and 22.

Fifth Embodiment

In the above described embodiment, the phase angle of the AC control voltage is changed in the drive control, but with the phase angle of the AC control voltage being fixed, an average value of the AC control voltage may be changed to perform the drive control. Specifically, the drive control means may be comprised so as to control the switch elements that constitute the inverter circuit to apply the AC control voltage having the same frequency as the no-load induced voltage of the armature coil 11A from the battery 3 (the voltage storage means) through the inverter circuit 4B to the armature coil, change the average value of the AC control voltage with the phase angle of the AC control voltage being fixed at a set phase angle, and thus control to keep the output of the magneto generator at the target value.

In this case, the control mode switching means switches the control mode to the chopper control mode in a state where the output of the magneto generator can be controlled by the chopper control mode, and to the drive control mode in a state where the output cannot be controlled by the chopper control mode, the chopper control mode being the control mode where the control to keep the output of the magneto generator at the target value is performed by the chopper control means, and the drive control mode being the control mode where the control to keep the output of the magneto generator at the target value is performed by the drive control means.

When the drive control means is thus comprised, the set phase angle of the AC control voltage is preferably set to an advancing side with respect to the phase of the no-load induced voltage of the armature coil (the reference phase). Fixing the phase angle of the AC control voltage to the advancing side with respect to the reference phase angle can reduce the output of the generator as the average value of the AC control voltage increases, and thus the control by the drive control mode is performed in the high speed rotation range where the output of the magneto generator increases, to restrain the output of the generator and control to keep the output at the target value.

In the case where the output current (the charging current of the battery in this embodiment) to rotational speed characteristic of the magneto generator shows a characteristic in FIG. 26 in the chopper control, if the target value of the charging current is 20.0 A, control to match the charging current with target value cannot be performed even with a duty ratio of 0 in a range of rotational speeds above 7000 rpm. Thus, performing the chopper control only causes an increase in the output of the magneto generator above the target value as the rotational speed increases.

On the other hand, if the output of the magneto generator is controlled by the drive control in the high speed rotation range, and the phase angle of the AC control voltage in the drive control is fixed at the set phase angle set to the advancing side with respect to the phase of the no-load induced voltage, increasing the average value of the AC control voltage can restrain the output of the magneto generator, and thus the control to keep the output of the magneto generator at the target value can be performed in the high speed rotation range without any trouble.

The control mode switching means may be also comprised so as to set the control mode to the chopper control mode at the start of the magneto generator, switch the control mode to the drive control mode when the duty ratio becomes zero and the output of the magneto generator becomes higher than the target value in the control by the chopper control mode, and switch the control mode to the chopper control mode when the output cannot reach the target value even with the average value of each half wave of the AC control voltage being zero in the control by the drive control mode.

Figure 14:
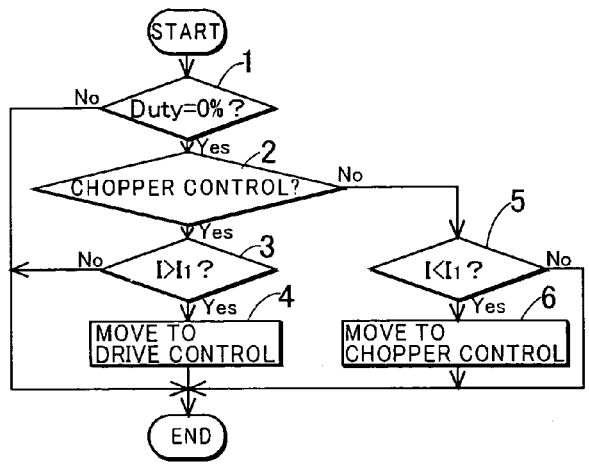
FIG. 14 is a flowchart of an algorithm of a program executed by a microprocessor for constructing control mode switching means in the fifth embodiment of the invention.

FIG. 14 shows a flowchart of an algorithm of a program executed by the microprocessor when the control mode is switched as described above, taking as an example the case where the output current of the magneto generator is the output. When the output current of the magneto generator is the output, as shown in FIG. 4, a current detector 13 that detects the output current of the magneto generator (the sum of the charging current of the battery and the current passing the load 8) is provided, and the output of the current detector is input to the controller 7.

Figure 4:
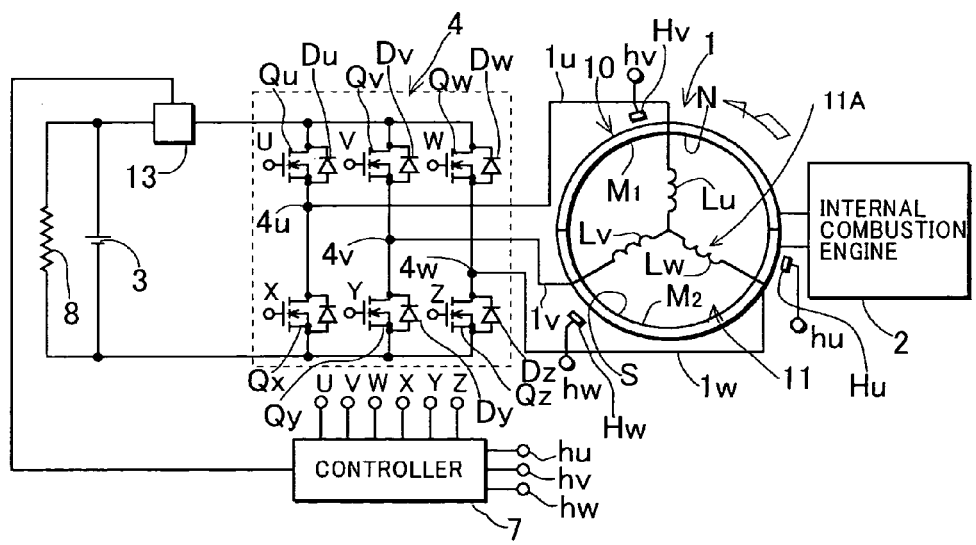
FIG. 4 is a circuit diagram of a still further construction example of hardware of a generating device according to the invention.

In the example in FIG. 4, position sensors Hu to Hw are provided that are constituted by hall ICs that detect a polarity of a magnetic pole of the magnet rotor 10 relative to the three phase coils Lu to Lw of the armature coil in order to obtain a signal for determining the phase angle of the AC control voltage. The position sensor Hu provided relative to the U-phase coil Lu outputs a position detection signal hu that rises from a low level to a high level at timing which is advanced more than of a zero point when a no-load induced voltage induced in the coil Lu moves from a negative half wave to a positive half wave. The position sensor Hv provided relative to the V-phase coil Lv outputs a position detection signal hv that rises from a low level to a high level at timing which is advanced more than of a zero point (a reference phase) when a no-load induced voltage induced in the coil Lv moves from a negative half wave to a positive half wave. Similarly, the position sensor Hw provided relative to the W-phase coil Lw outputs a position detection signal hw that rises from a low level to a high level at timing which is advanced more than of a zero point (a reference phase) when a no-load induced voltage induced in the coil Lw moves from a negative half wave to a positive half wave.

Thus, the switch elements that constitute the inverter circuit are controlled to turn on/off so that the positive half wave of the AC control voltage rises that is applied to the U-phase coil Lu to the W-phase coil Lw, respectively at the timing when the position detection signals hu to hw rise from the low level to the high level, and thus the AC control voltage having the phase angle set to the advancing side with respect to the reference phase from the battery 3 to the inverter circuit can be applied to the three phase coils Lu to Lw.

A routine in FIG. 14 is executed at regular time intervals after the magneto generator is started and the control of the output of the magneto generator by the chopper control mode is started. When the routine is started, it is first determined in Step 1 whether the duty ratio of the chopper control is 0%. When it is determined that the duty ratio is not 0% (when the output of the magneto generator can be adjusted by adjusting the duty ratio in the chopper control), no operation is performed (the control mode remains in the chopper control mode) to finish the routine. When it is determined in Step 1 that the duty ratio is 0%, the process proceeds to Step 2, and it is determined whether the present control mode is the chopper control mode. When it is determined that the present control mode is the chopper control mode, the process proceeds to Step 3, and it is determined whether an output current I (an output) of the generator detected by the current detector 13 is higher than a target value I1. When it is determined that the output current I is not higher than the target value I1, the routine is finished without switching the control mode. When it is determined in Step 3 that the output current I is higher than the target value I1 (when the charging current cannot be restrained to the target value I1 by the chopper control because of an increase in the rotational speed or the like), the process moves to Step 4, and the control mode is switched to the drive control mode with the phase angle being fixed.

In the drive control mode, control is performed that changes the average value of each half wave of the AC control voltage to approximate the output voltage of the magneto generator 1 to the target value. Because the phase angle of the AC control voltage is set to the advancing side, increasing the average value of each half wave of the AC control voltage can restrain the output of the magneto generator, and decreasing the average value of each half wave of the AC control voltage can increase the output of the magneto generator. When the average value of each half wave of the AC control voltage is zero, the output current of the magneto generator in the drive control becomes maximum, and when the average value of each half wave of the AC control voltage is maximum (a maximum value depends on a battery voltage), the output current of the magneto generator in the drive control becomes minimum.

As described above, for the construction where the phase angle of the AC control voltage is fixed to the advancing side in the drive control, and the average value of the AC control voltage is changed to control the output of the generator, it is preferable to set the set phase angle of the AC control voltage so that the output of the magneto generator becomes zero before the average value of the AC control voltage becomes maximum (until the duty ratio becomes 100% for an AC control voltage having a PWM modulated waveform) when the rotational speed of the generator is the maximum rotational speed, in order to increase an adjustment range of the output of the magneto generator in the drive control. Such setting allows the output of the generator to be controlled from zero to the target value by the drive control.

Figure 27:
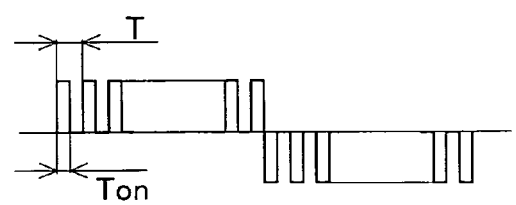
FIG. 27 is a waveform chart of an example of a waveform of an AC control voltage used in the drive control.

In order to facilitate the control of the average value of the AC control voltage, as shown in FIG. 27, a positive half wave and a negative half wave of the AC control voltage are interrupted with a fixed duty ratio DF at a regular PWM cycle T to provide a PWM modulated waveform (a rectangular waveform in the shown example), and the drive control means is preferably comprised so as to change the PWM modulated duty ratio to change the average value of the AC control voltage. In this case, the duty ratio DF is defined by a formula: $DF=Ton/T$, where Ton is an on period. When the duty ratio DF is 0%, the average value of the positive half wave and the negative half wave of the AC control voltage becomes zero, and when the duty ratio DF is 100%, the average value of the positive half wave and the negative half wave of the AC control voltage becomes maximum.

When it is determined in Step 1 in FIG. 14 that the duty ratio is 0, and it is determined in Step 2 that the present control mode is not the chopper control mode, the process proceeds to Step 5, and it is determined whether the output current I is lower than the target value I1. When it is determined that the output current I is not lower than the target value I1, the routine is finished without switching the control mode (the control mode remains in the drive control mode). When it is determined in Step 5 that the output current is lower than the target value I1 (when the output of the magneto generator cannot reach the target value by the drive control because of a decrease in the rotational speed or the like), the process proceeds to Step 6, and the control mode is switched to the chopper control mode.

According to the algorithm in FIG. 14, duty ratio determination means that determines whether the duty ratio of the chopper control is zero is constructed by Step 1, and chopper control/drive control switching means that switches the control mode from the chopper control mode to the drive control mode when the duty ratio of the chopper control is zero, and the output of the magneto generator is higher than the target value in the control by the chopper control mode is constructed by Steps 2, 3 and 4. Drive control/chopper control switching means that switches the control mode to the chopper control mode when the output cannot reach the target value by the drive control mode is constructed by Steps 2, 5 and 6.

As described above, for the construction such that the control mode is switched from the chopper control mode to the drive control mode, and from the drive control mode to the chopper control mode, in the state where the duty ratio of the chopper control is substantially zero (without interrupting the rectified output of the generator) and the average value of each half wave of the AC control voltage of the drive control mode is substantially zero (the state of applying no AC control voltage), the output characteristic of the magneto generator when the control mode is switched from the chopper control mode to the drive control mode, and from the drive control mode to the chopper control mode is the characteristic when the generating device is comprised of the magneto generator and the rectifier circuit only without performing the chopper control and the drive control, thereby causing little change of the output current of the generator between before and after the control mode is switched. This prevents a large change of the output current of the generator to continue smooth control without an arithmetical operation of the duty ratio or the phase angle when the control is switched.

In the above described example, the target value I1 of the output current is the target value of the sum of the current passing through the load 8 and the charging current of the battery 3, but a current detector may be provided so as to detect the charging current only to control to keep the charging current at the target value.

When the output voltage of the magneto generator is detected to control the output voltage as the output, the phase angle of the AC control voltage may be also fixed in the drive control to change the average values of the positive half wave and the negative half wave of the AC control voltage and thus control to keep the output at the target value.

Sixth Embodiment

Figure 9:
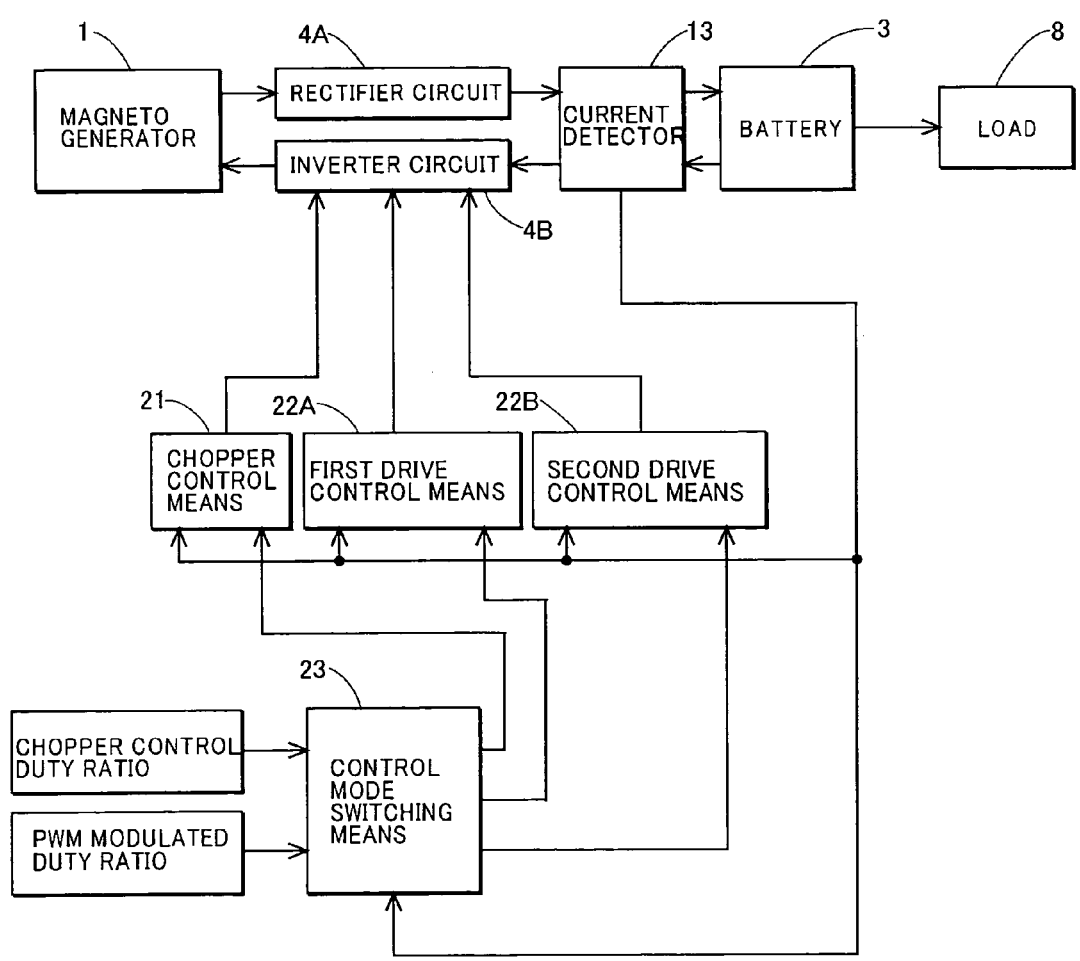
FIG. 9 is a block diagram of a construction of a control unit according to a sixth embodiment of the invention.

In the above described embodiment, there are provided the drive control means that changes the average value of the positive half wave and the negative half wave of the AC control voltage, with the phase angle of the AC control voltage being fixed, to control the output of the magneto generator, and the chopper control means. As shown in FIG. 9, however, there may be provided chopper control means 21 that controls on/off of the switch elements that constitute the inverter circuit 4B so as to interrupt a current passing from the magneto generator 1 through the rectifier circuit 4A with a predetermined duty ratio to control to keep the output of the magneto generator at the target value; first drive control means 22A that controls the switch elements that constitute the inverter circuit 4B so as to apply the AC control voltage having the same frequency as the no-load induced voltage of the armature coil from the battery (voltage storage means) 3 through the inverter circuit 4B to the armature coil, change the average value of each half wave of the AC control voltage with the phase angle of the AC control voltage being fixed at a set phase angle set to an advancing side with respect to the phase angle of the no-load induced voltage, and thus control to keep the output of the magneto generator at the target value; second drive control means 22B that controls the switch elements that constitute the inverter circuit 4B so as to apply the AC control voltage having the same frequency as the no-load induced voltage of the armature coil from the voltage storage means through the inverter circuit 4B to the armature coil, change the phase angle of the AC control voltage with the average value of the AC control voltage being fixed, and thus control to keep the output of the magneto generator 1 at the target value; and control mode switching means 23 that switches the control mode by the control means.

In this case, the control mode switching means 23 is comprised so as to set the control mode to a chopper control mode at a start of the magneto generator 1, switch the control mode to a first drive control mode when the output of the magneto generator 1 becomes higher than the target value and the duty ratio becomes zero in the control by the chopper control mode, switch the control mode to the chopper control mode when the output of the magneto generator 1 cannot reach the target value in the control by the first control mode, switch the control mode to a second drive control mode when the output of the magneto generator becomes higher than the target value even if the average value of each half wave of the AC control voltage becomes maximum in the control by the first control mode, and switch the control mode to the first drive control mode when the output cannot reach the target value in the control by the second drive control mode, the chopper control mode being a control mode where control to keep the output of the magneto generator at the target value is performed by the chopper control means 21, the first drive control mode being a control mode where control to keep the output of the magneto generator at the target value is performed by the first drive control means 22A, and the second drive control mode being a control mode where control to keep the output of the magneto generator at the target value is performed by the second drive control means 22B.

As described above, when the first drive control means and the second drive control means are provided, the control mode switching means is preferably comprised so as to switch the control mode from the chopper control mode to the first drive control mode and from the first drive control mode to the chopper control mode in a state where the duty ratio of the chopper control is substantially zero and a PWM modulated duty ratio of the AC control voltage of the first drive control mode is substantially zero, and switch the control mode from the first drive control mode to the second drive control mode and from the second drive control mode to the first drive control mode in a state where the PWM modulated duty ratio of the AC control voltage is substantially 100%, in order to switch the control mode without changing the output current of the generator.

FIG. 15 shows a flowchart of an algorithm of a program executed by the microprocessor for constructing the control mode switching means in the embodiment. A routine in FIG. 15 is executed at regular time intervals after the magneto generator is started by the chopper control mode. When the routine is started, in Step 1, it is determined whether the present control mode is the chopper control mode. When it is determined that the present control mode is the chopper control mode, the process proceeds to Step 2, and it is determined whether an output current I (an output) of the generator detected by the current detector 13 is higher than a target value I1. When it is determined that the output current I is higher than the target value I1, the process proceeds to Step 3, and it is determined whether the duty ratio DF of the chopper control is 0%. When it is determined that the duty ratio DF is 0%, the process proceeds to Step 4, the control mode is switched to the first drive control mode, and then the routine is finished.

When it is determined in Step 2 that the output current I is not higher than the target value I1, and it is determined in Step 3 that the duty ratio DF of the chopper control is not 0% (in both cases, the output of the generator can be controlled by the chopper mode), no operation is performed (the control mode remains in the chopper control mode) to finish the routine.

When it is determined in Step 1 that the present control mode is not the chopper control mode, the process proceeds to Step 5, and it is determined whether the present control mode is the first drive control mode. When it is determined that the present control mode is not the first drive control mode, the process proceeds to Step 6, and it is determined whether the output current I of the magneto generator is lower than the target value I1. When it is determined that the output current is not lower than the target value I1 (when the control is performed by the second drive control), no operation is performed (the control mode remains in the second drive control mode) to finish the routine.

When it is determined in Step 6 that the output current I is lower than the target value I1, the process proceeds to Step 7, and it is determined whether the control phase angle of the second drive control is the set phase angle of the first drive control. When it is determined that the control phase angle is not the set phase angle of the first drive control, the routine is finished without switching the control mode. When it is determined in Step 6 that the output current I is lower than the target value, and it is determined in Step 7 that the control phase angle is the set phase angle of the first drive control, the process proceeds to Step 8, and the control mode is switched to the first drive control mode to finish the routine.

When it is determined in Step 5 that the present control mode is the first drive control mode, the process proceeds to Step 9, and it is determined whether the output current I of the magneto generator is lower than the target value. When it is determined that the output current I is lower than the target value I1, the process proceeds to Step 10, and it is determined whether the PWM modulated duty ratio DF of the AC control voltage is 0% (whether the average value of each half wave of the AC control voltage is zero). When it is determined that the duty ratio is not 0%, the routine is finished without switching the control mode. When it is determined in Step 10 that the duty ratio is zero (when the output current of the magneto generator cannot reach the target value even with the average value of the AC control voltage being zero because of a decrease in the rotational speed or the like), the process proceeds to Step 11, and the control mode is switched to the chopper control mode.

When it is determined in Step 9 that the output current I is not lower than the target value I1, the process moves to Step 12, and it is determined whether the output current I is higher than the target value I1. When it is determined that the output current I is not higher than the target value I1 (when the output current is equal to the target value), the routine is finished without switching the control mode (the control mode remains in the first drive control mode).

When it is determined in Step 12 that the output current I is higher than the target value I1, it is then determined in Step 13 whether the PWM modulated duty ratio of the AC control voltage in the first drive control is 100%. When it is determined that the duty ratio is not 100% (when the output current of the magneto generator can be restrained by the first drive control), the routine is finished without switching the control mode. When it is determined in Step 13 that the PWM modulated duty ratio of the AC control voltage is 100% (when the output current of the generator cannot be restrained by the first drive control because of an increase in the rotational speed or the like), the process moves to Step 14, and the control mode is switched to the second drive control mode. In the second drive control mode, control can be performed that changes the phase angle of the AC control voltage to a further advancing side with the PWM modulated duty ratio of the AC control voltage being 100% to restrain the output current of the magneto generator.

Also in the fifth and sixth embodiments, the signal generating device that generates the signals for determining the phase angle of the AC control voltage can be used that includes the rotor having the reluctor and the pulse signal generator that detects the edge of the reluctor to generate pulses (shown in FIG. 1).

In the above description, the chopper control is performed by simultaneously controlling on/off of the switch elements Qx to Qz that constitute the lower branch of the bridge of the inverter circuit, but the chopper control may be performed by simultaneously controlling on/off of the switch elements Qu to Qw that constitute the upper branch of the bridge of the inverter circuit.

In the above description, the MOSFETs are used as the switch elements that constitute the inverter circuit, but the switch elements may be such as to be controlled to turn on/off, and bipolar transistors or IGBTs may be used as switch elements that constitute the inverter circuit.

When an output voltage of the magneto generator is an output, control mode switching means may be constructed by an algorithm similar to the algorithm in FIG. 15.

In each embodiment, the battery is used as the voltage storage means, but a capacitor may be used as voltage storage means.

As described above, there are provided the chopper control means that controls the output of the magneto generator by the chopper control; the drive control means that controls the output of the magneto generator by the drive control; and the control mode switching means that switches the control mode according to the control mode switching condition that is at least the rotational speed of the magneto generator, so that the control by the chopper control mode is performed when the rotational speed is low, and the control by the drive control mode is performed when the rotational speed is high, and thus the control by the chopper control mode can be performed during the low speed rotation of the magneto generator to increase the output of the generator and reduce the rotational speed at which the load starts to be driven.

During the high speed rotation where the output of the generator cannot be controlled by the chopper control, the output of the generator can be controlled by the drive control, and thus the output of the generator can be controlled without using a short circuit type regulator from the low speed rotation range to the high speed rotation range without any trouble.

Therefore, according to the invention, the output in the low speed rotation range can be increased without increasing the size of the magneto generator, and the control to keep the generation output at the target value from the low speed rotation range to the high speed rotation range can be performed without any trouble.

In the invention, in the case where the control mode switching means includes: the means for arithmetically operating the phase angle of the AC control voltage in the drive control mode so as to match the current output from the magneto generator at the start of the drive control mode with the current output by the magneto generator in the chopper control mode, when the control mode is switched from the chopper control mode to the drive control mode; and the means for arithmetically operating the duty ratio of the chopper control so as to match the current output from the magneto generator at the start of the chopper control mode with the current output by the magneto generator in the drive control mode, when the control mode is switched from the drive control mode to the chopper control mode, the output current of the generator can be prevented from changing when the control mode is switched from the chopper control mode to the drive control mode and from the drive control mode to the chopper control mode, thereby preventing the change of the output of the magneto generator when the control mode is switched or the change of the load torque of the motor causing the change of the rotational speed, and allowing stable control.

In the invention, in the case where the drive control means is comprised so as to change the average value of the AC control voltage with the phase angle of the AC control voltage being fixed at the set phase angle set to the advancing side to control to keep the output of the magneto generator at the target value, and the set phase angle is set so that the output current of the magneto generator becomes zero until the average value of each half wave of the AC control voltage becomes maximum when the rotational speed of the generator is the maximum rotational speed in the drive control mode, the output of the generator can be controlled from zero to the target value by the drive control mode.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:
1. A generating device comprising:
   a magneto generator having a magnet rotor and a stator with an n-phase armature coil (n is an integer equal to or more than one);

voltage storage means;
an n-phase diode bridge full-wave rectifier circuit that converts an AC output of said magneto generator into a DC output to apply the DC output to said voltage storage means;
an n-phase bride type inverter circuit in which each branch of a bridge is constituted by switch elements, said voltage storage means is connected between DC terminals, and an AC terminal is connected to an output terminal of said magneto generator; and
a controller that controls the switch elements of said inverter circuit so as to keep the output of said magneto generator at a target value, a load being connected across said voltage storage means,
wherein said controller comprises:
chopper control means that controls on/off of a part of the switch elements that constitute said inverter circuit so as to interrupt a current passing from said magneto generator through said rectifier circuit with a predetermined duty ratio to control to keep the output of said magneto generator at the target value;
drive control means that controls the switch elements that constitute said inverter circuit so as to apply an AC control voltage having the same frequency as a no-load induced voltage of said armature coil from said voltage storage means through said inverter circuit to said armature coil, and changes a phase angle of said AC control voltage to control to keep the output of said magneto generator at the target value; and
control mode switching means that switches a control mode from a chopper control mode to a drive control mode and from the drive control mode to the chopper control mode according to a control mode switching condition that is at least a rotational speed of said magneto generator, so that control by said chopper control mode is performed when said rotational speed of said magneto generator is low, and control by said drive control mode is performed when the rotational speed of said magneto generator is high, said chopper control mode being a control mode where control to keep the output of said magneto generator at the target value is performed by said chopper control means, and said drive control mode being a control mode where control to keep the output of said magneto generator at the target value is performed by said drive control means.

2. The generating device according to claim 1, wherein position sensors are provided that detect a polarity of a magnetic pole of said magnet rotor relative to the armature coil of each phase of said magneto generator, and output detection signals having different levels depending on the polarity of the magnetic pole detected, and
said drive control means is comprised so as to determine the phase angle of said AC control voltage with respect to a generation phase of the detection signals output by said position sensors.

3. The generating device according to claim 1, wherein a signal generating device is provided that includes a signal generating rotor having a reluctor that rotates with said magnet rotor, and a pulse signal generator that detects an edge of the reluctor of said signal generating rotor to generate pulses, and
said drive control means is comprised so as to determine the phase angle of said AC control voltage with respect to a generation phase of the pulses output by said pulse signal generator.

4. The generating device according to claim 1, wherein said control mode switching means comprises:
chopper control/drive control switching means including phase angle arithmetical operation means that arithmetically operates a phase angle of the AC control voltage required for outputting a current equal to a current output by said magneto generator when said rotational speed reaches said set speed in the control by said chopper control mode, from said magneto generator at a start of control by said drive control mode, and drive control starting means that starts the control by said drive control mode with the phase angle arithmetically operated by said phase angle arithmetical operation means being an initial value of the phase angle of the AC control voltage; and
drive control/chopper control switching means including duty ratio arithmetical operation means that arithmetically operates a duty ratio of the chopper control required for outputting a current equal to a current output by said magneto generator when said rotational speed reaches said set speed in the control by said drive control mode, from said magneto generator at a start of control by said chopper control mode, and chopper control starting means that starts the control by said chopper control mode with the duty ratio arithmetically operated by said duty ratio arithmetical operation means being an initial value.

5. The generating device according to claim 1, wherein said control mode switching means comprises:
chopper control/drive control switching means including first generator output estimation means that estimates an output current of said magneto generator from a duty ratio of the chopper control when said rotational speed reaches said set speed in the control by said chopper control mode, phase angle arithmetical operation means that determines a phase angle of said AC control voltage required for matching a current output by said magneto generator at the start of the control by said drive control mode with the output current estimated by said first generator output estimation means, and drive control starting means that starts the control by said drive control mode with the phase angle arithmetically operated by said phase angle arithmetical operation means being an initial value of the phase angle of said AC control voltage; and
drive control/chopper control switching means including second generator output estimation means that estimates an output current of said magneto generator from a phase angle of the drive control when said rotational speed reaches said set speed in the control by said drive control mode, duty ratio arithmetical operation means that determines a duty ratio of the chopper control required for matching a current output by said magneto generator at the start of the control by the chopper control mode with the output current estimated by said second generator output estimation means, and chopper control starting means that starts the control by said chopper control mode with the duty ratio arithmetically operated by said duty ratio arithmetical operation means being an initial value.

6. The generating device according to claim 1, wherein said control mode switching means is comprised so as to switch said control mode to the drive control mode when said rotational speed becomes higher than said set speed, the output of said magneto generator becomes lower than a set value, and the duty ratio of said chopper control reaches a value that maximizes the output current of said magneto generator in the control by said chopper control mode, and switch said control mode to the chopper control mode when said rotational speed becomes lower than said set speed, the output of said magneto generator becomes lower than said set value, and the phase angle of said AC control voltage reaches a value that maximizes the output current of said magneto generator in the control by the drive control mode.

7. The generating device according to claim 1, wherein said control mode switching means comprises:

map storage means that stores a chopper control maximum output current arithmetical operation map used for arithmetically operating a maximum current output by said magneto generator at each rotational speed in said chopper control; a phase angle arithmetical operation map that provides a relationship between the rotational speed of said magneto generator, the output current of said magneto generator, and the phase angle of the AC control voltage of the drive control; a drive control maximum output current arithmetical operation map used for arithmetically operating a maximum current output by the magneto generator at each rotational speed in the drive control; and a duty ratio arithmetical operation map that provides a relationship between the rotational speed of said magneto generator, the output current of said magneto generator, and the duty ratio of the chopper control;

chopper control/drive control switching means including chopper control maximum output current arithmetical operation means that retrieves said chopper control maximum output current arithmetical operation map relative to the rotational speed to arithmetically operate the maximum current output by said magneto generator when a first control mode switching condition is met, said first control mode switching condition being such that the rotational speed becomes higher than the set speed, the output of the magneto generator becomes lower than the set value, and the duty ratio of the chopper control reaches the value that maximizes the output current of the magneto generator, in the control by said chopper control mode; phase angle arithmetical operation means that retrieves said phase angle arithmetical operation map relative to the maximum output current arithmetically operated by said chopper control maximum output current arithmetical operation means and the rotational speed to arithmetically operate a phase angle of the AC control voltage required for outputting a current equal to said maximum output current from the magneto generator at the start of the drive control; and drive control starting means that starts the control by the drive control mode with the phase angle arithmetically operated by said phase angle arithmetical operation means being an initial value of the phase angle of the AC control voltage; and drive control/chopper control switching means including drive control maximum output current arithmetical operation means that retrieves said drive control maximum output current arithmetical operation map relative to the rotational speed to arithmetically operate the maximum current output by said magneto generator when a second control mode switching condition is met, said second control mode switching condition being such that the rotational speed becomes lower than the set speed, the output of said magneto generator becomes lower than the set value, and the phase angle of the drive control reaches the value that maximizes the output current of said magneto generator in the control by the drive control mode; duty ratio arithmetical operation means that retrieves said duty ratio arithmetical operation map relative to the maximum output current arithmetically operated by said drive control maximum output current arithmetical operation means and the rotational speed to arithmetically operate a duty ratio of the chopper control required for outputting a current equal to the maximum output current from the magneto generator at the start of the chopper control; and chopper control starting means that starts the control by the chopper control mode with the duty ratio arithmetically operated by said duty ratio arithmetical operation means being an initial value of the duty ratio of the chopper control.

8. A generating device comprising:

a magneto generator having a magnet rotor and a stator with an n-phase armature coil (n is an integer equal to or more than one);

voltage storage means;

an n-phase diode bridge full-wave rectifier circuit that converts an AC output of said magneto generator into a DC output to apply the DC output to said voltage storage means;

an n-phase bride type inverter circuit in which each branch of a bridge is constituted by switch elements, said voltage storage means is connected between DC terminals, and an AC terminal is connected to an output terminal of said magneto generator; and a controller that controls the switch elements of said inverter circuit so as to keep the output of said magneto generator at a target value, a load being connected across said voltage storage means, wherein said controller comprises:

chopper control means that controls on/off of the switch elements that constitute said inverter circuit so as to interrupt a current passing from said magneto generator through said rectifier circuit with a predetermined duty ratio, and changes a duty ratio of the on/off control of said switch elements as the output of said magneto generator changes to control to approximate said output to the target value;

drive control means that controls the switch elements that constitute said inverter circuit so as to apply an AC control voltage having the same frequency as a no-load induced voltage of said armature coil from said voltage storage means through said inverter circuit to said armature coil, change an average value of each half wave of said AC control voltage as said output changes, with the phase angle of said AC control voltage being fixed at a set phase angle, and thus control to keep the output of said magneto generator at the target value;

control mode switching means that switches a control mode so as to set the control mode to a chopper control mode when the output of said magneto generator can be controlled by said chopper control mode, and switch the control mode to a drive control mode when said output cannot be controlled by said chopper control mode, said chopper control mode being a control mode where control to keep the output of said magneto generator at the target value is performed by said chopper control means, and said drive control mode being a control mode where control to keep the output of said magneto generator at the target value is performed by said drive control means.

9. The generating device according to claim 8, wherein said set phase angle is set so that an output current of said magneto generator becomes zero before the average value of each half wave of said AC control voltage becomes maximum when said rotational speed is a maximum rotational speed in the control by said drive control mode.

10. The generating device according to claim 8, wherein said set phase angle is set to an advancing side with respect to the phase angle of the no-load induced voltage of said armature coil, and said control mode switching means is comprised so as to set the control mode to said chopper control mode at a start of said magneto generator, switch the control mode to said drive control mode when said duty ratio becomes zero in the control by said chopper control mode, and switch the control mode to said chopper control mode when said output cannot reach the target value even with the average value of each half wave of said AC control voltage being zero in the control by said drive control mode.

11. The generating device according to claim 8, wherein said set phase angle is set to an advancing side with respect to the phase angle of the no-load induced voltage of said armature coil, and said control mode switching means is comprised so as to set the control mode to said chopper control mode at the start of said magneto generator, switch the control mode to said drive control mode when said duty ratio becomes zero in the control by said chopper control mode and the output of said magneto generator becomes higher than the target value, and switch the control mode to said chopper control mode when said output cannot reach said target value even with the average value of each half wave of said AC control voltage being zero in the control by said drive control mode.

12. The generating device according to claim 8, wherein a positive half wave and a negative half wave of said AC control voltage are interrupted with a fixed duty ratio at a regular PWM cycle to provide a PWM modulated waveform, and said drive control means is comprised so as to change said PWM modulated duty ratio to change the average value of said AC control voltage.

13. The generating device according to claim 12, wherein said control mode switching means is comprised so as to switch the control mode from the chopper control mode to the drive control mode and from the drive control mode to the chopper control mode in a state where the duty ratio of the chopper control is substantially zero and the PWM modulated duty ratio of the AC control voltage of the drive control mode is substantially zero.

14. A generating device comprising:

a magneto generator having a magnet rotor and a stator with an n-phase armature coil (n is an integer equal to or more than one);

voltage storage means;

an n-phase diode bridge full-wave rectifier circuit that converts an AC output of said magneto generator into a DC output to apply the DC output to said voltage storage means;

an n-phase bride type inverter circuit in which each branch of a bridge is constituted by switch elements, said voltage storage means is connected between DC terminals, and an AC terminal is connected to an output terminal of said magneto generator; and a controller that controls the switch elements of said inverter circuit so as to keep the output of said magneto generator at a target value, a load being connected across said voltage storage means, wherein said controller comprises:

chopper control means that controls on/off of a part of the switch elements that constitute said inverter circuit so as to interrupt a current passing from said magneto generator through said rectifier circuit with a predetermined duty ratio to control to keep the output of said magneto generator at the target value;

first drive control means that controls the switch elements that constitute said inverter circuit so as to apply an AC control voltage having the same frequency as a no-load induced voltage of said armature coil from said voltage storage means through said inverter circuit to said armature coil, change an average value of each half wave of said AC control voltage with a phase angle of said AC control voltage being fixed at a set phase angle set to an advancing side with respect to a phase angle of said no-load induced voltage, and thus control to keep the output of said magneto generator at the target value;

second drive control means that controls the switch elements that constitute said inverter circuit so as to apply the AC control voltage having the same frequency as the no-load induced voltage of said armature coil from said voltage storage means through said inverter circuit to said armature coil, change the phase angle of said AC control voltage with the average value of said AC control voltage being fixed, and thus control to keep the output of said magneto generator at the target value; and control mode switching means that sets a control mode to a chopper control mode at a start of said magneto generator, switch said control mode to a first drive control mode when the output of said magneto generator becomes higher than the target value and said duty ratio becomes zero in the control by said chopper control mode, switch the control mode to said chopper control mode when the output of said magneto generator cannot reach the target value in the control by said first control mode, switch the control mode to a second drive control mode when the output of said magneto generator becomes higher than the target value even if the average value of each half wave of said AC control voltage becomes maximum in the control by said first control mode, and switch the control mode to said first drive control mode when said output cannot reach the target value in the control by said second drive control mode, said chopper control mode being a control mode where control to keep the output of said magneto generator at the target value is performed by said chopper control means, said first drive control mode being a control mode where control to keep the output of said magneto generator at the target value is performed by said first drive control means, and said second drive control mode being a control mode where control to keep the output of said magneto generator at the target value is performed by said second drive control means.

15. The generating device according to claim 14, wherein position sensors are provided that detect a polarity of a magnetic pole of said magnet rotor relative to the armature coil of each phase of said magneto generator, and output detection signals having different levels depending on the polarity of the magnetic pole detected, and said second drive control means is comprised so as to determine the phase angle of said AC control voltage with respect to a generation phase of the detection signals output by said position sensors.

16. The generating device according to claim 14, wherein a signal generating device is provided that includes a signal generating rotor having a reluctor that rotates with said magnet rotor, and a pulse signal generator that detects an edge of the reluctor of said signal generating rotor to generate pulses, and said second drive control means is comprised so as to determine the phase angle of said AC control voltage with respect to a generation phase of the pulses output by said pulse signal generator.

17. The generating device according to claim 14, wherein a positive half wave and a negative half wave of said AC control voltage are interrupted with a fixed duty ratio at a regular PWM cycle to provide a PWM modulated waveform, and said first drive control means is comprised so as to change said PWM modulated duty ratio to change the average value of each half wave of said AC control voltage.

18. The generating device according to claim 17, wherein said control mode switching means is comprised so as to switch the control mode from the chopper control mode to the first drive control mode and from the first drive control mode to the chopper control mode in a state where the duty ratio of said chopper control is substantially zero and the PWM modulated duty ratio of the AC control voltage of the first drive control mode is substantially zero, and switch the control mode from the first drive control mode to the second drive control mode and from the second drive control mode to the first drive control mode in a state where the PWM modulated duty ratio is substantially 100%.

* * * * *